June 2, 1942.  R. H. TURNER  2,284,933
TYPING APPARATUS
Filed Feb. 8, 1940  18 Sheets-Sheet 1

INVENTOR
Ransom H. Turner
BY
ATTORNEY

June 2, 1942.  R. H. TURNER  2,284,933
TYPING APPARATUS
Filed Feb. 8, 1940  18 Sheets-Sheet 2

INVENTOR
Ransom H. Turner
BY
J. R. Davis
ATTORNEY

Fig. 2

June 2, 1942.  R. H. TURNER  2,284,933
TYPING APPARATUS
Filed Feb. 8, 1940  18 Sheets-Sheet 3

INVENTOR
Ransom H. Turner
BY
ATTORNEY

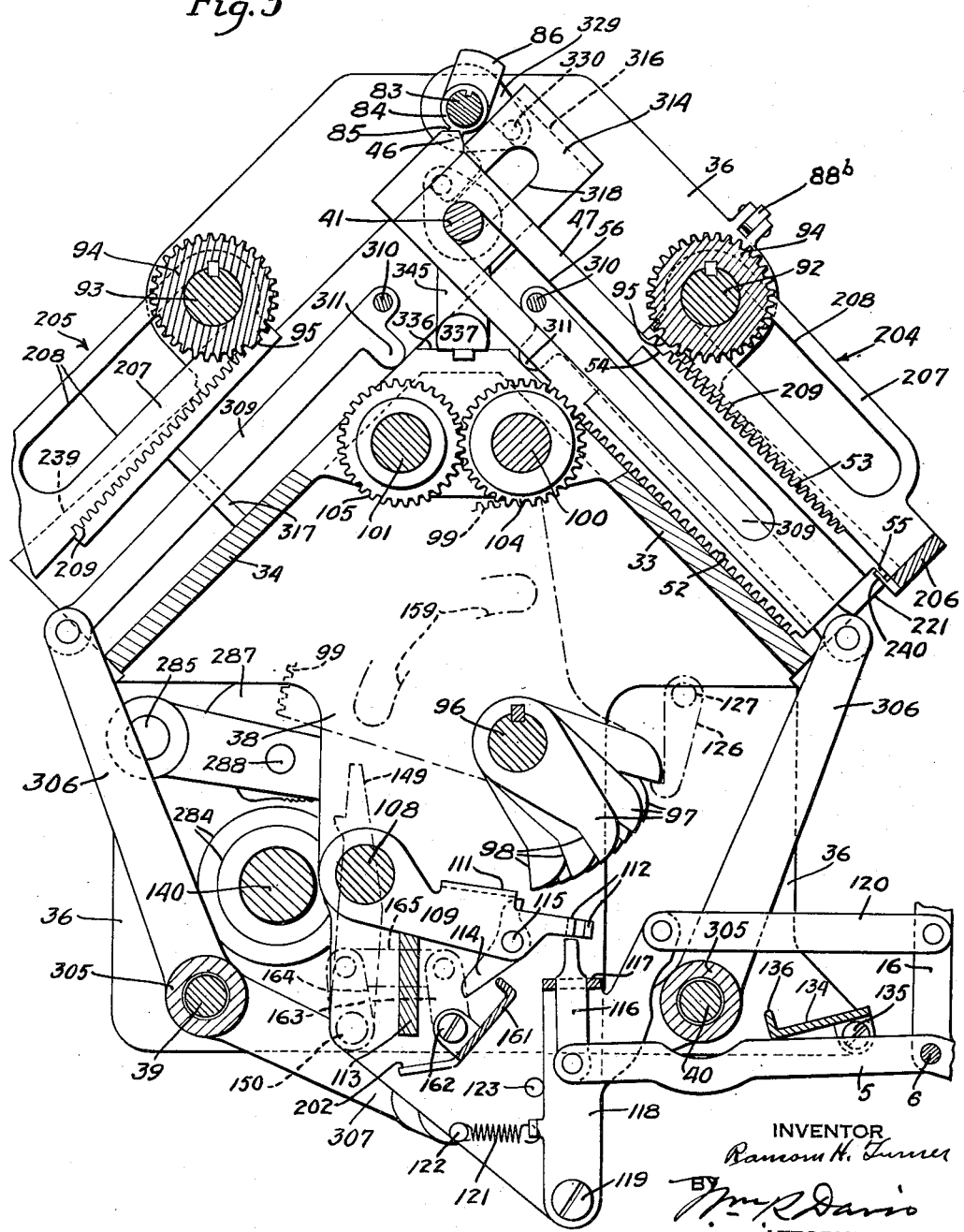

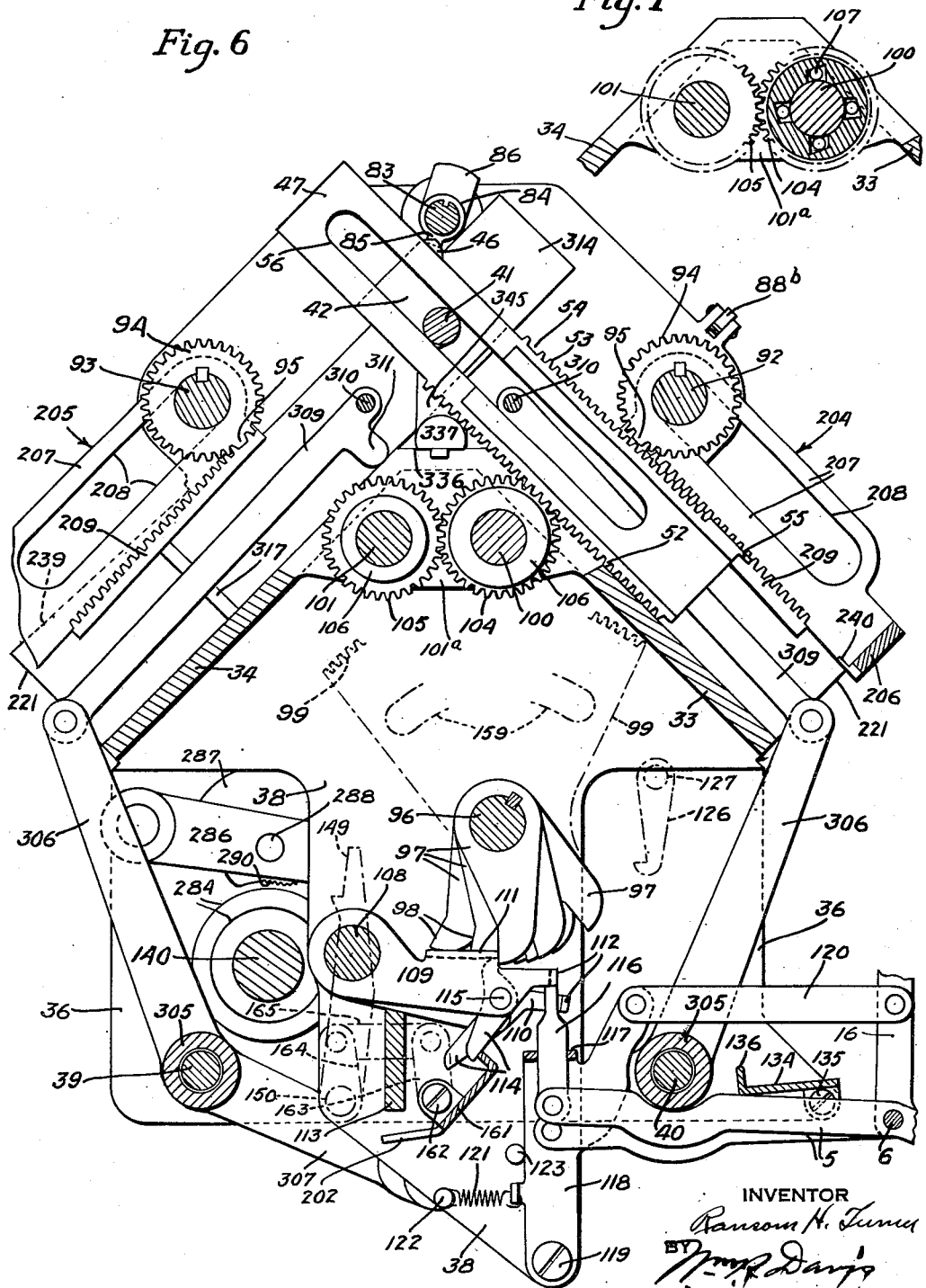

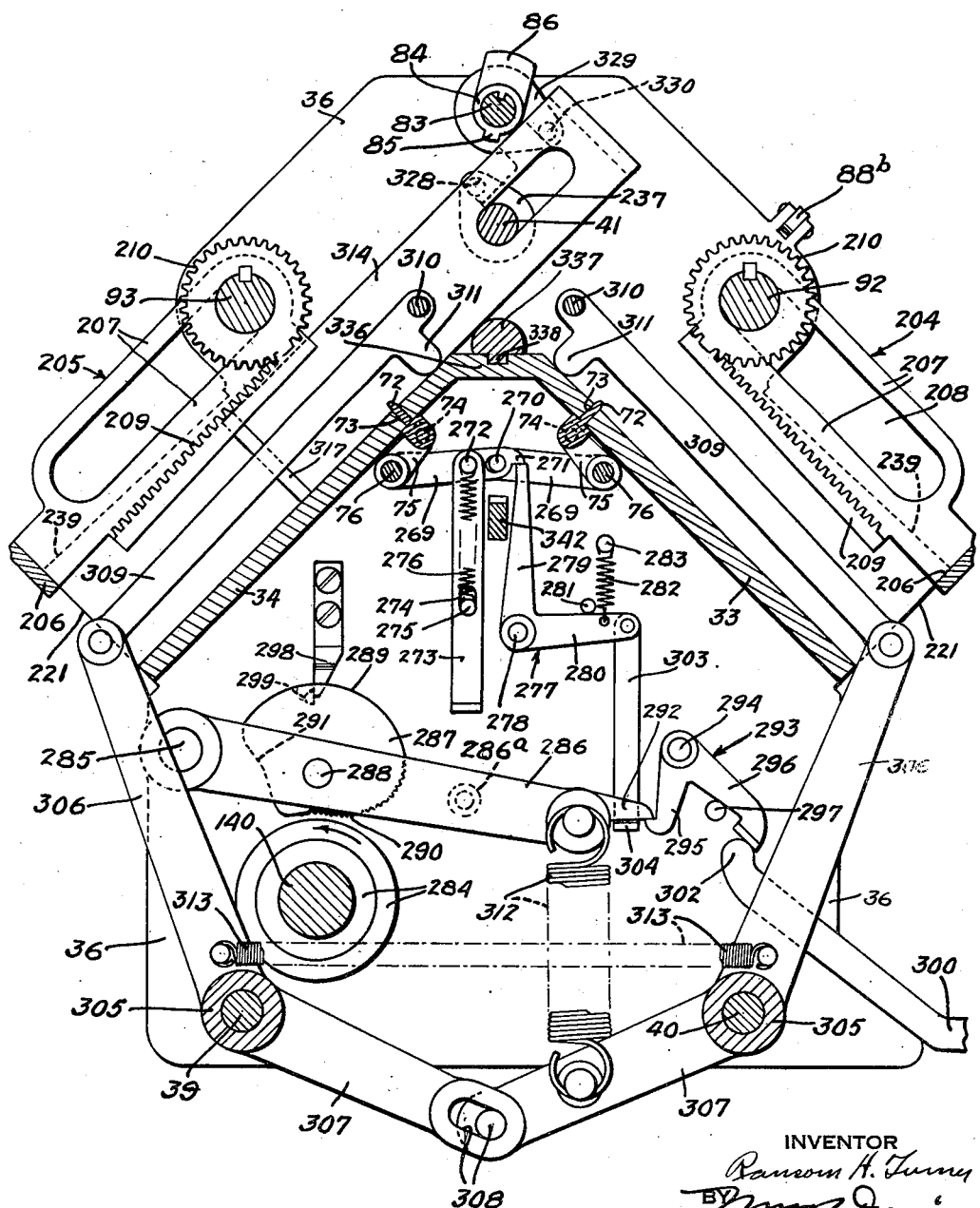

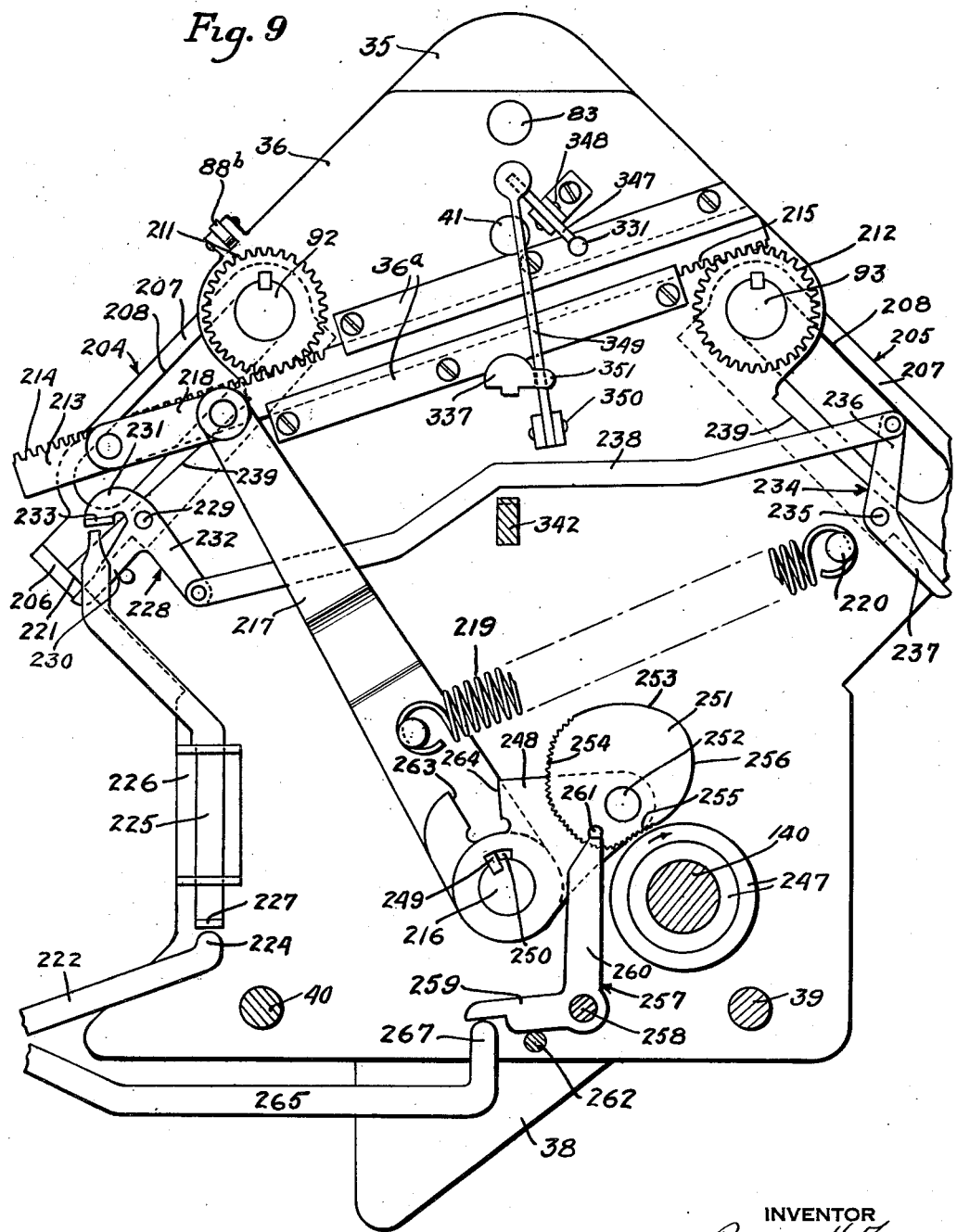

Fig. 10

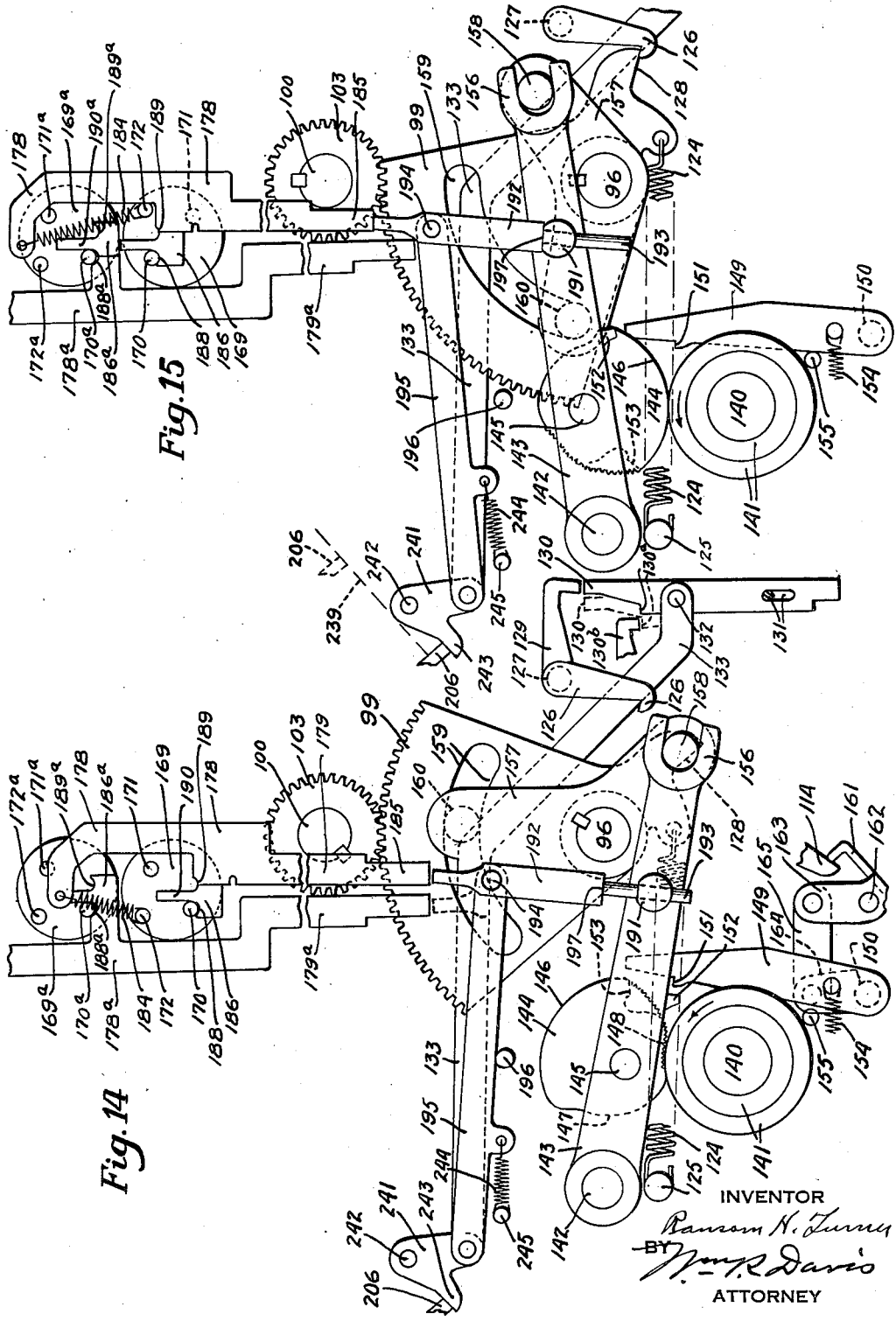

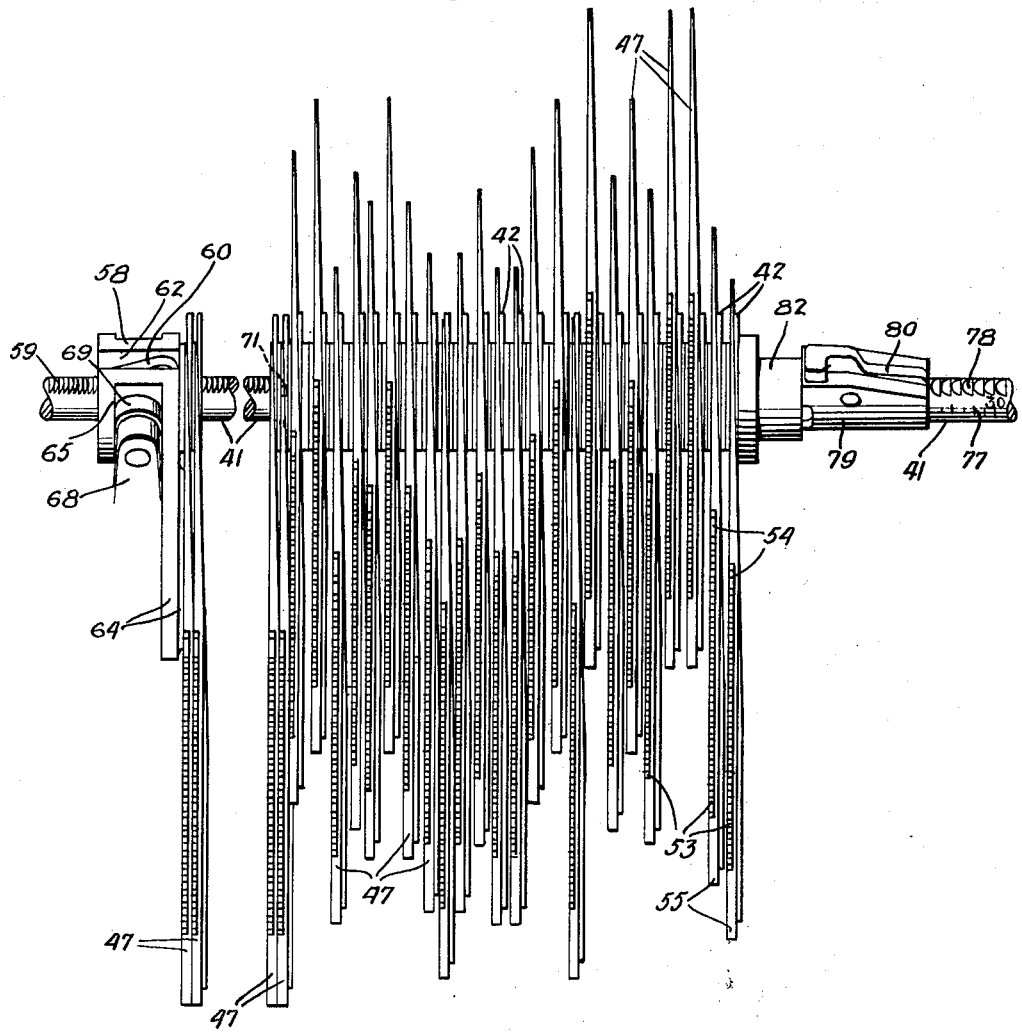

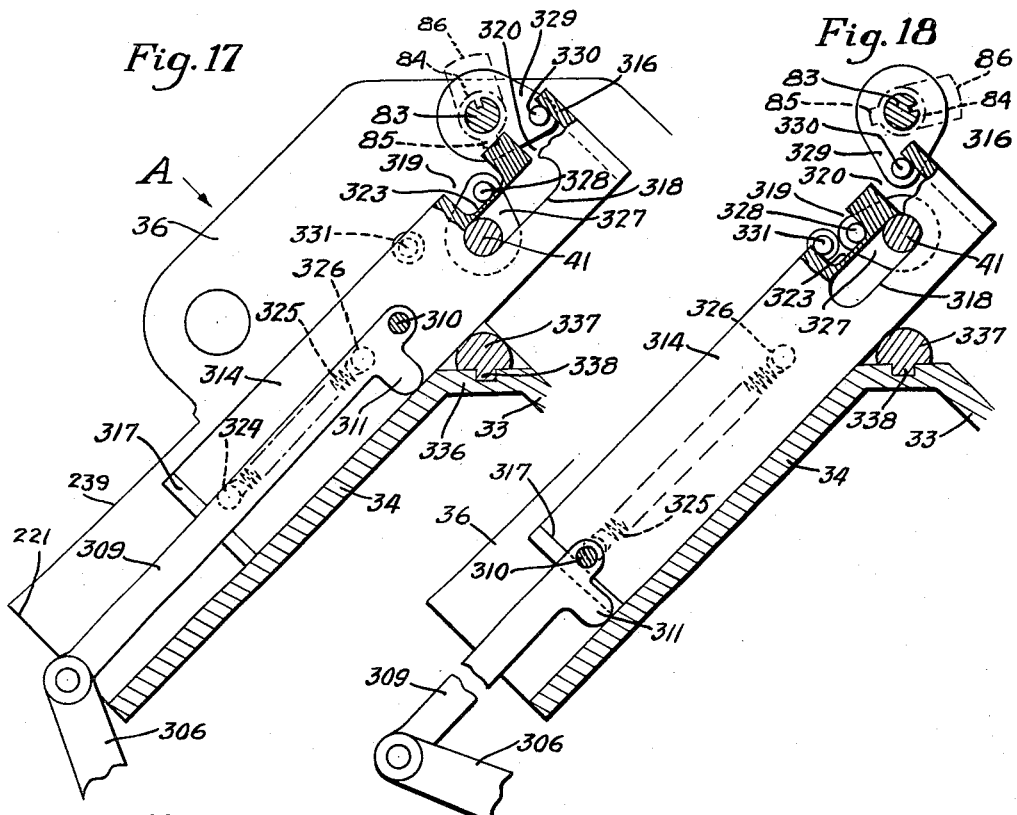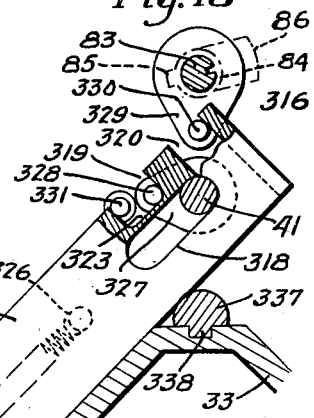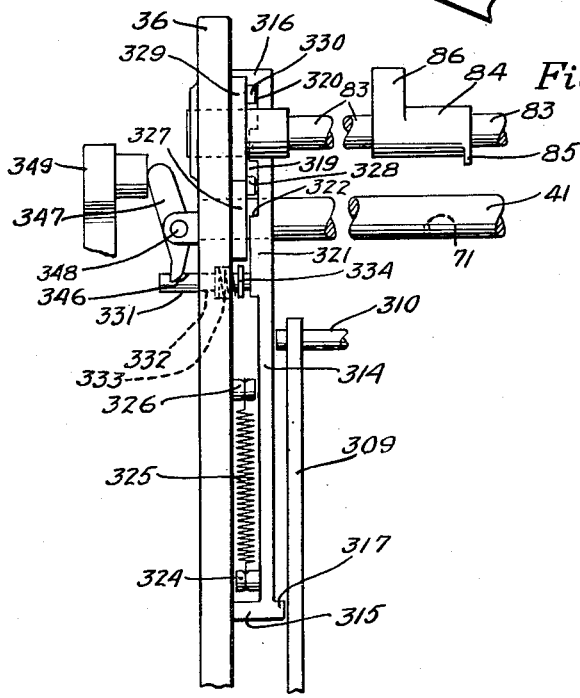

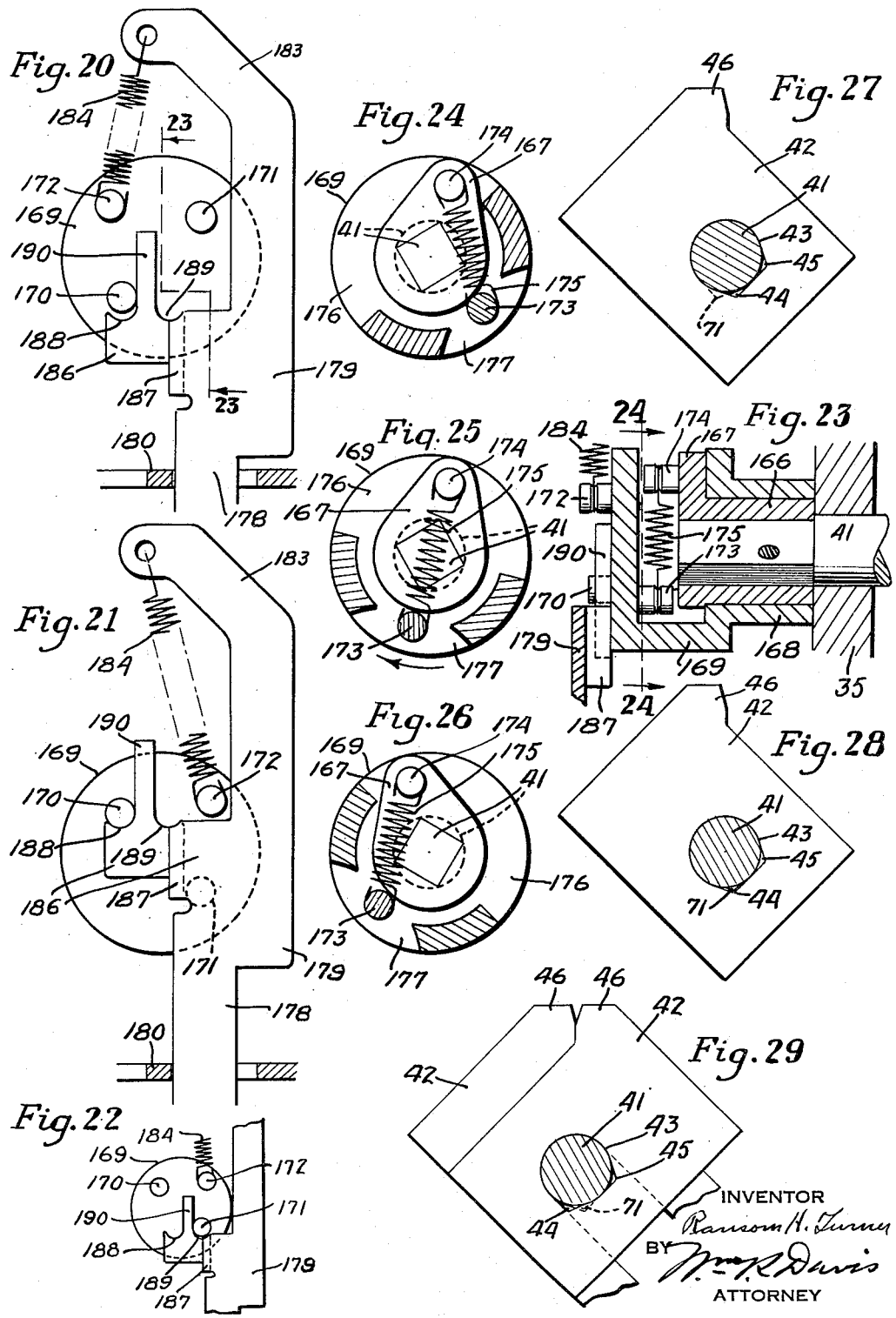

June 2, 1942.  R. H. TURNER  2,284,933
TYPING APPARATUS
Filed Feb. 8, 1940  18 Sheets-Sheet 15
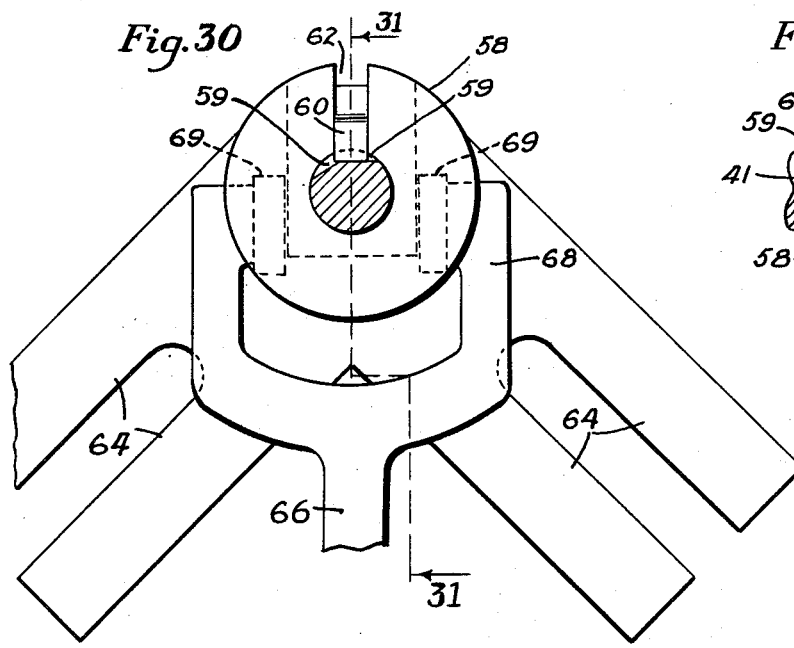
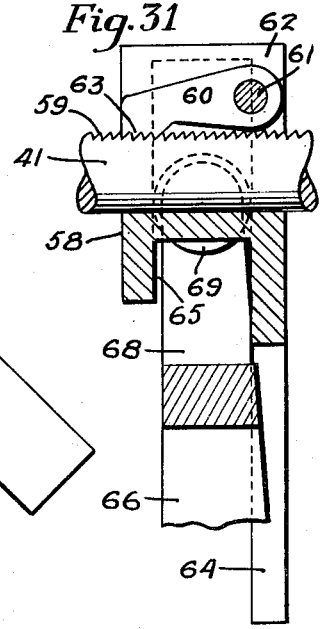
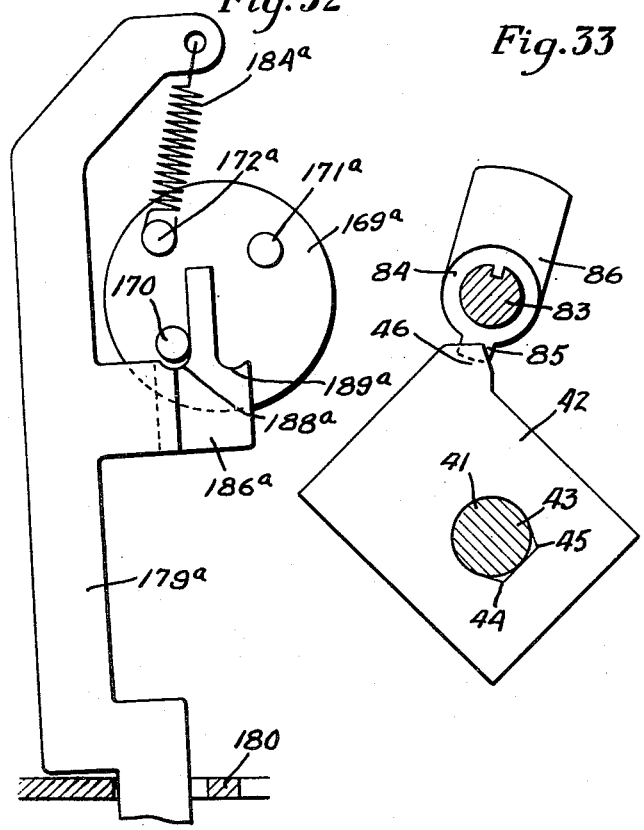
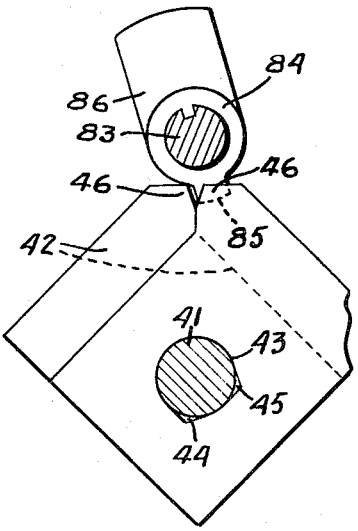
INVENTOR
Ransom H. Turner
BY
ATTORNEYS June 2, 1942. R. H. TURNER 2,284,933
TYPING APPARATUS
Filed Feb. 8, 1940 18 Sheets-Sheet 16
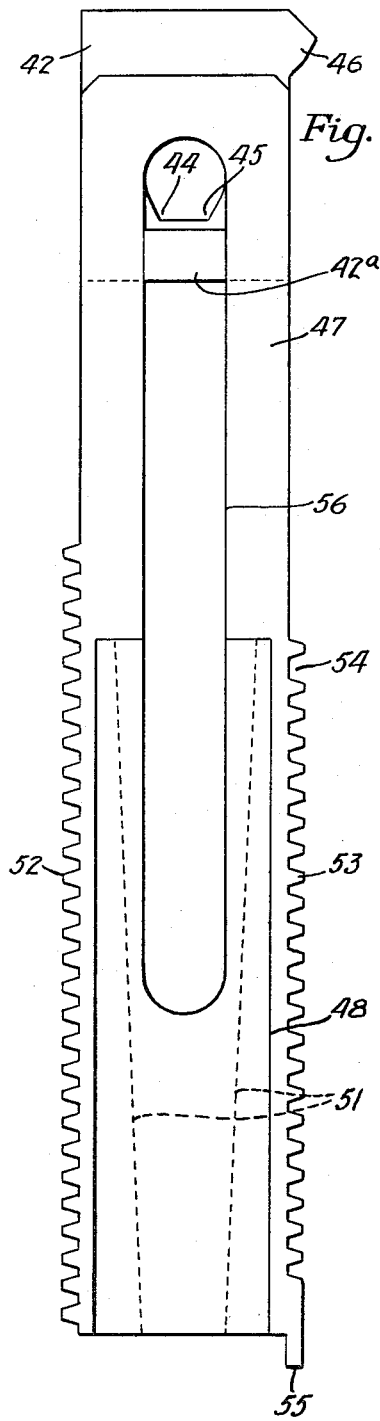
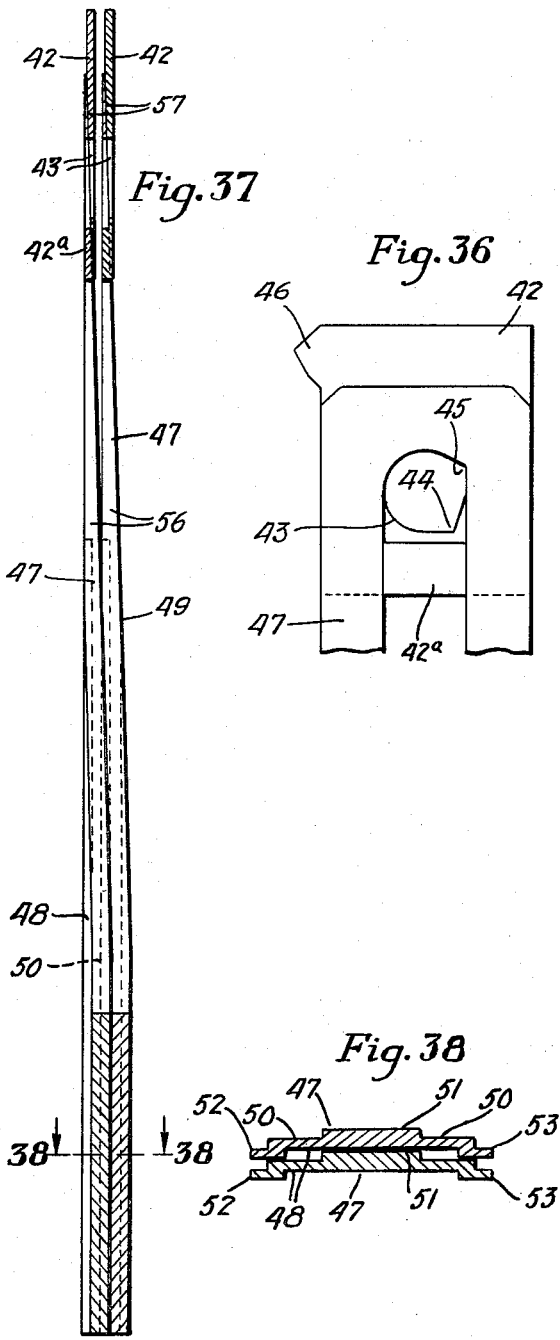
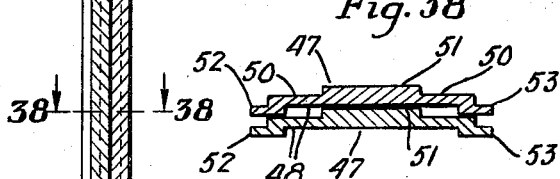
INVENTOR
Ramon H. Turner
BY Wm R Davis
ATTORNEYS

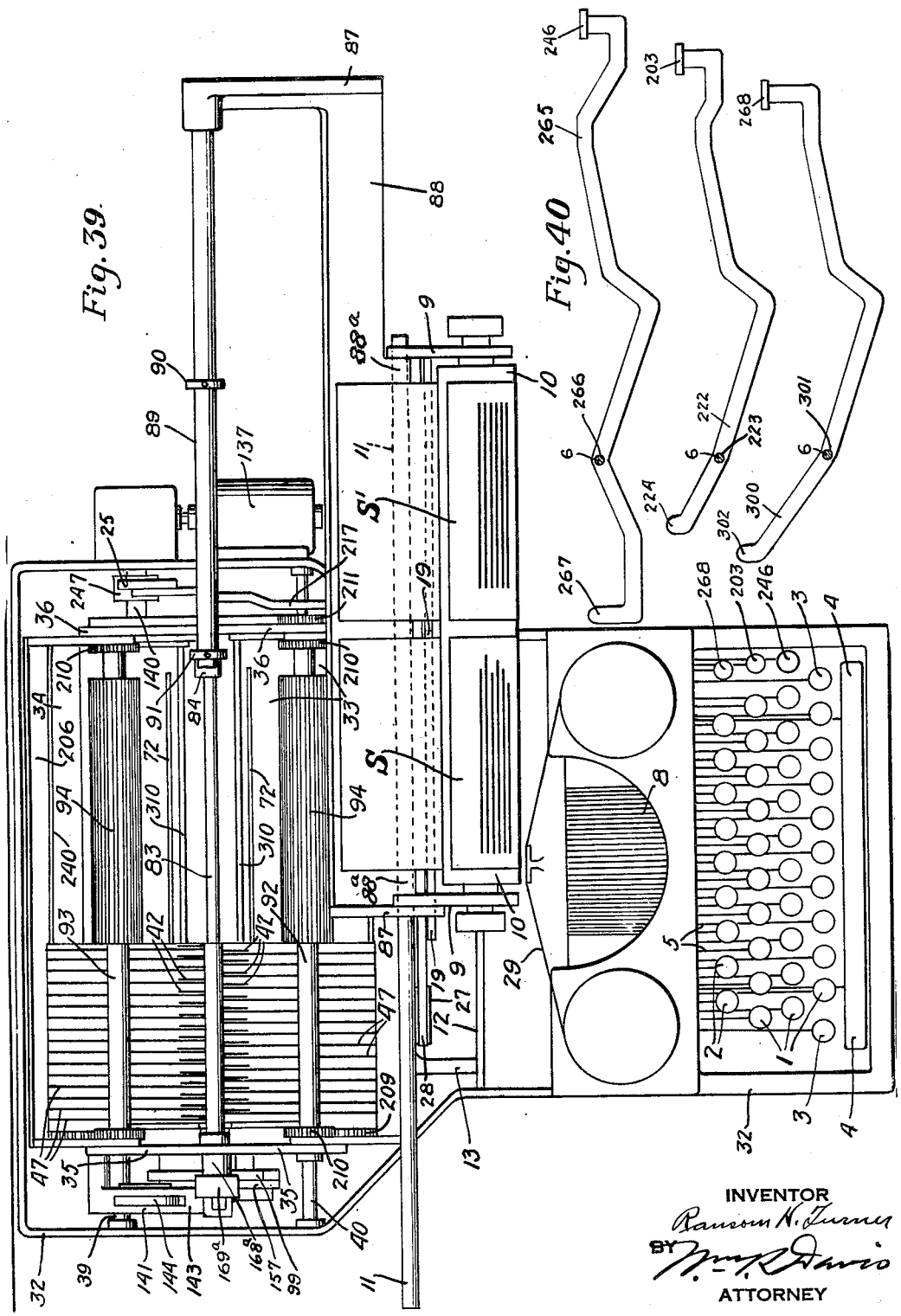

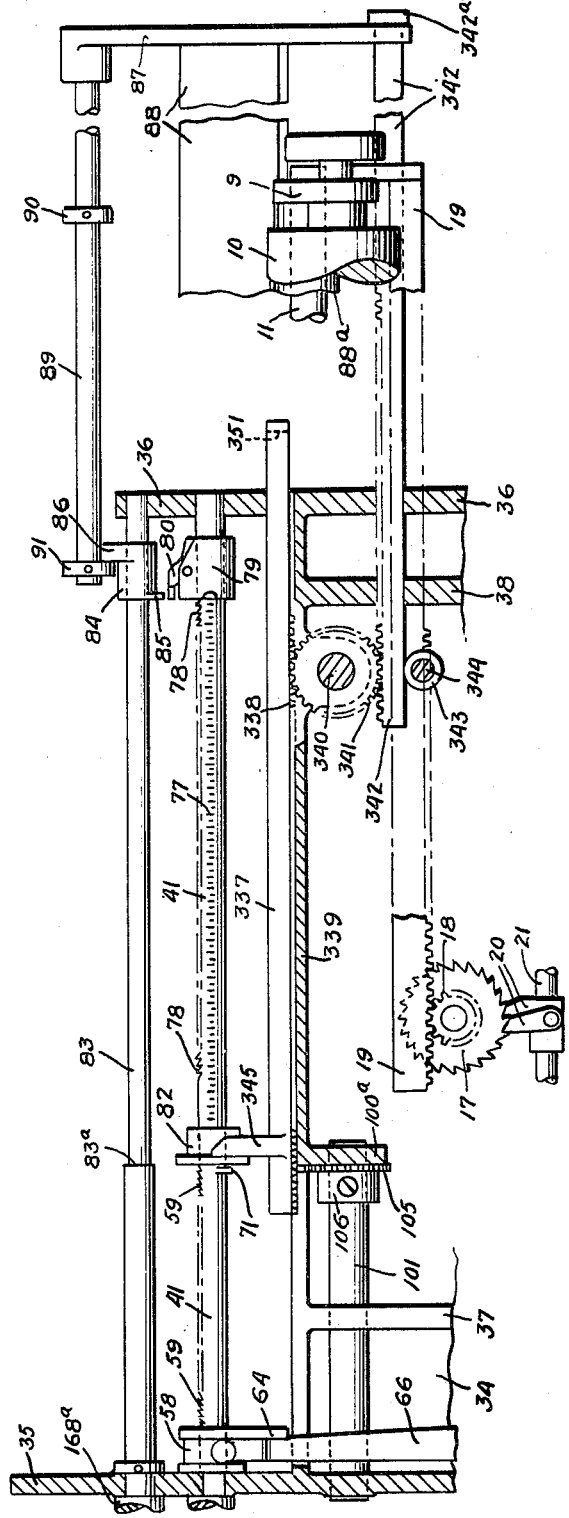

Patented June 2, 1942

2,284,933

UNITED STATES PATENT OFFICE 2,284,933

TYPING APPARATUS

Ransom H. Turner, Great Neck, N. Y.

Application February 8, 1940, Serial No. 317,913

68 Claims. (Cl. 197—84)

This invention relates more particularly to improved means for preparing justified type copy suitable for photographic reproduction for employment in printing processes of the lithographic type such as planographic and offset printing.

In the preparation of copy for offset printing it is now the general practice to prepare first, a preliminary typed copy of the matter to be printed. Type for printing the matter contained in said copy are then prepared by a linecasting machine. From the type so prepared, and all composed, a printed impression is made to obtain a master copy. Then, a photographic reproduction of said master copy is made upon a sheet or plate which is subsequently applied to a printing press for offset printing. This practice requires the employment of an expensive line-casting machine and the expensive services of an operator for such a machine in order to obtain proper setwise spacing of the printed characters and justified lines. This feature of said practice contributes much to the cost of offset printing.

An important object of the present invention is to facilitate and reduce the cost of preparation of the master copy by provision of typing apparatus capable of producing typewritten master copy with properly spaced characters and justified lines and entirely suitable for direct photographic reproduction for offset printing.

Other objects of the invention will appear hereinafter.

In the drawings, Fig. 1 is a vertical fore-and-aft sectional view of the apparatus, approximately on the line I—I of Fig. 2;

Fig. 2 is a horizontal sectional view approximately on the line 2—2 of Fig. 1, parts being broken away and parts omitted;

Fig. 5 is an enlarged vertical section approximately on the line 5—5 of Fig. 2, the parts shown being in normal position;

Fig. 6 is a view similar to Fig. 5, showing the parts in the positions which they assume immediately after the operation of a character key;

Fig. 7 is a detail vertical section through the gearing for advancing the spacing wedges for character spacing;

Fig. 8 is an enlarged vertical section approximately on the line 8—8 of Fig. 2, the parts shown being in normal position;

Fig. 9 is an enlarged vertical section approximately on the line 9—9 of Fig. 2, the parts being shown in normal position;

Fig. 10 is an enlarged vertical section approximately on the line 10—10 of Fig. 2, parts being broken away and parts omitted;

Fig. 14 is a left side view of the mechanisms for causing advance of the wedges for character space stop setting and for causing operation of the escapement means associated with the wedges and stop elements, certain of the parts being in the positions which they assume upon operation of a character key;

Fig. 15 is a view similar to Fig. 14 and showing certain of the parts shifted for operating the stop-releasing escapement means;

Fig. 16 is a plan view of the assembly of stop elements and spacing wedges and associated parts viewed to show the full length of the forward wedges and the upper ends of the rear wedges, a number of the wedges being advanced for stop setting, some of the wedges being omitted and certain of the associated parts being broken away;

Fig. 17 is a section approximately on the line 17—17 of Fig. 11 and shows, in normal positions, an escapement-controlling slide and a means for operating said slide and for retracting wedges advanced for character space setting of the stops;

Fig. 18 is a view similar to Fig. 17, showing the said slide shifted by its said operating means to a position to render the escapement means inoperable;

Fig. 19 is a plan view of the parts shown in Fig. 17, and associated parts, as viewed in the direction indicated by the arrow A in Fig. 17, parts being broken away;

Fig. 20 is a detail side elevation of mechanism for operating the escapement means for releasing the stop elements, guide means for an element of said mechanism being shown in section;

Fig. 21 is a view similar to Fig. 20, showing said mechanism operated for shifting said escapement means;

Fig. 22 is a reduced scale view similar to Fig. 20, showing said mechanism set for reversing the shift of the escapement means;

Fig. 23 is a section approximately on the line 23—23 of Fig. 20;

Figs. 24, 25 and 26 are sections each taken on the line 24—24 of Fig. 23 and showing the parts in different operated positions;

Fig. 27 is a detail view showing the rock shaft which bears the settable stop elements in cross section, one of said stop elements thereon in elevation and an escapement stop element on said shaft in a position to hold said stop element against advance along the shaft;

Fig. 28 is a view similar to Fig. 27, showing the escapement element rocked to a position to release the stop element for advance along the shaft;

Fig. 29 is a view similar to Fig. 28, showing several of the stop elements on the shaft and the escapement element in position to release one of the stop elements and hold a following stop element, a portion of the wedge for setting the released element being shown also;

Fig. 30 is a view showing the said rock shaft in cross section and showing, in elevation, the means for exerting pressure upon the bank of stop elements to advance the bank step-by-step as the stop elements are released in succession;

Fig. 31 is a section on the line 31—31 of Fig. 30;

Fig. 32 is a detail side elevation of mechanism for operating the escapement element which cooperates with the set stop elements to control carriage travel in justified typing; guide means for an element of said mechanism being shown in section;

Fig. 33 is a detail view showing, in cross section, the rock shafts bearing the stop-controlling escapement element and the carriage-controlling escapement respectively and showing, in elevation, the latter escapement element in engagement with one of the stop elements.

Fig. 34 is a view similar to Fig. 33 and including several of the stop elements, with the carriage-controlling escapement element rocked to a position to pass one of the stop elements and engage a following one of the stop elements;

Fig. 35 is a detail side elevation of one of the stop-setting wedges and an associated one of the stop elements;

Fig. 36 is a side elevation of an upper end portion of another one of the wedges and an associated stop element;

Fig. 37 is a central longitudinal sectional view of several adjacent ones of the wedges and associated stop elements;

Fig. 38 is a cross section on the line 38—38 of Fig. 37;

Fig. 39 is a plan view of the apparatus, parts being omitted;

Fig. 40 is a group view showing several of the keys and key levers of the apparatus in side elevation; and Fig. 41 is a central vertical transverse section through the upper portion of the justifying mechanism, parts being in elevation, parts broken away and parts omitted.

Figure 1:
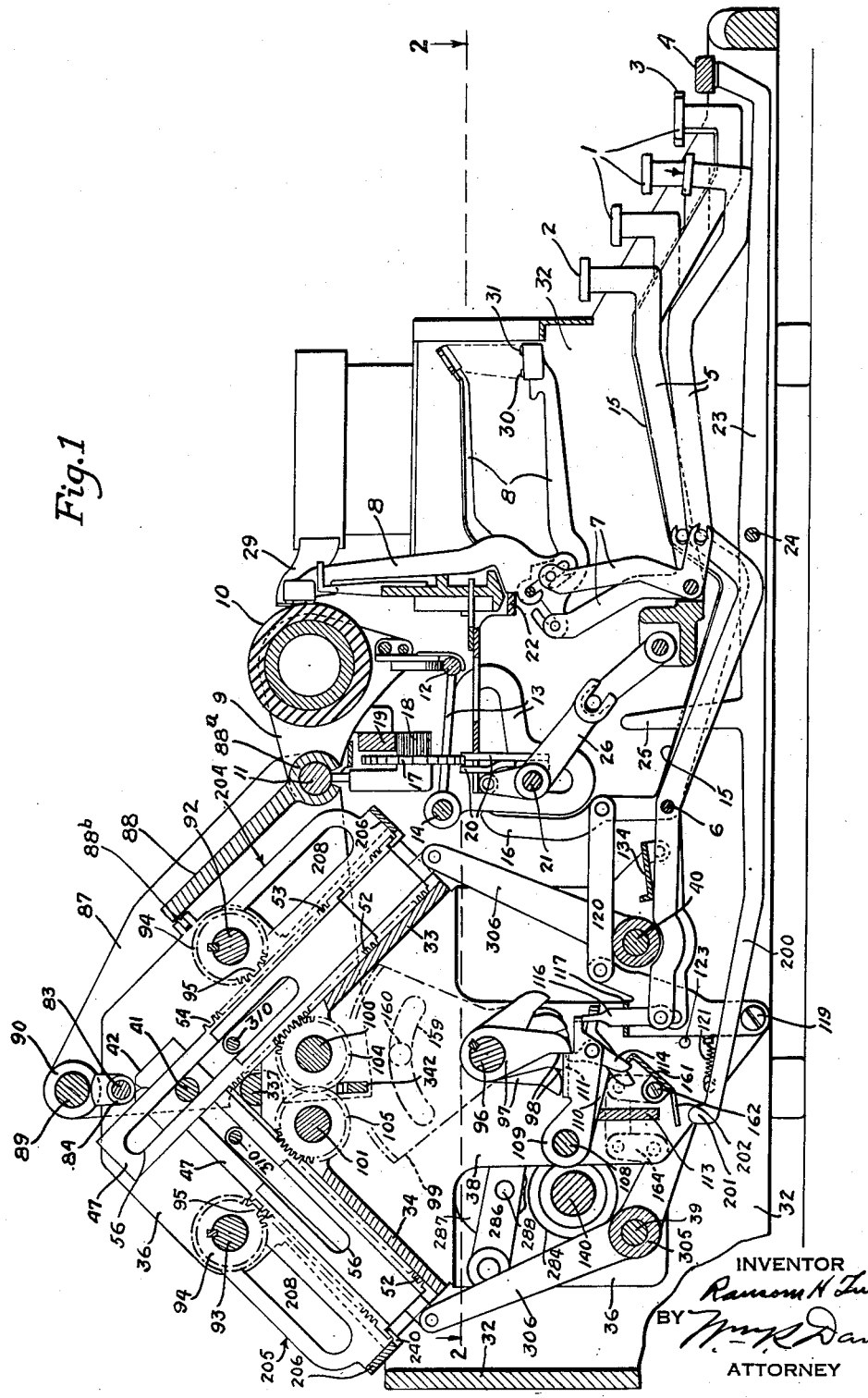

The typing apparatus includes a typewriting machine which is employed for preliminary typing of matter to be printed and for subsequent typing of a master copy of said matter. The typewriting machine has the usual escapement means for controlling the travel of the paper carriage of the machine in said preliminary typing. Special provision is made for controlling the travel of the carriage for the subsequent typing of the master copy. In combination with the typewriting machine there is a row of escapement stop elements extending along the line of carriage travel. These elements are settable varying distances apart in the series for the purpose of controlling the travel of the carriage for appropriate setwise spacing of the typed characters and for word spacing and line justification in the typing of the master copy. Key-responsive means are provided for such setting of the stop elements, and the setting is accomplished in said preliminary typing. Operation of the character keys in the preliminary typing causes accurate setting of the stop elements varying distances apart in accordance with setwise spacing appropriate to the different characters typed. At the conclusion of the preliminary typing a line-justifying key is operated and means responsive to operation of said key causes setting of the stop elements for word-spacing and line justifying. Then, in said master copy typing, a special escapement means cooperates with the set stop elements to control the travel of the carriage.

Printers' type are employed upon the type heads of the typewriting machine and that, together with the accurate setwise spacing of the typed characters and the justified lines, provided for by said stop setting, enables the production of a typed master copy practically identical to a printed one obtainable from a line-cast type set-up. Such a typed copy will be suitable in every way for photo-offset reproduction. The apparatus may also be employed satisfactorily for typing the master copy directly upon a sheet or plate to be applied to a press cylinder for offset printing, as in a known process.

The mechanism of the typewriter machine may be in general similar to that of any one of a number of well-known makes. In the present instance the mechanism is that of a standard Underwood typewriter. It has letter keys 1, figure keys 2, right and left hand case shift keys 3 and a space bar 4. Certain of the keys also bear the usual punctuation marks and symbols. The letter keys and figure keys are on levers 5 fulcrumed upon a cross bar 6 borne by the main frame and are operatively connected by sub-levers 7 to type bars 8. A carriage 9 bearing the platen 10 is mounted upon a rear bar 11 and an under bar 12 for travel crosswise of the machine. Bar 11 supports the carriage for case shift rocking and bar 12 is supported by a rocker 13 for rocking about a shaft 14, borne by the main frame of the machine to shift the carriage between upper and lower case positions. The case shift keys are on levers 15 fulcrumed on the cross bar 6 and each has an upwardly extending arm 16 engageable with the rocker 13 to cause shift of the platen to upper case position when either case shift key is pressed.

Mounted at a fixed point in the machine there is an escapement ratchet wheel 17 having a pinion 18 fixed to rotate therewith and to mesh with a carriage rack bar 19, having uniformly spaced rack teeth, as illustrated in Fig. 41, and as is usual in standard commercial typewriting machines. Rotation of the escapement wheel for advance of the carriage in the said preliminary typing is controlled by the escapement dogs 20 which are rockably mounted at a fixed point, as at 21. A universal bar 22 is engageable by the type bars and is operatively connected to the escapement dogs to rock them for advance of the carriage a step each time a character key is struck for typing. The space bar 4 is borne by levers 23 fulcrumed on a cross bar 24 borne by the main frame. One of the levers 23 has an upwardly extending arm 25 to engage a crank arm 26 operatively connected to the escapement dogs, to rock the dogs for advance of the carriage a step each time that the space bar is pressed. The carriage is advanced by the usual spring motor, indicated at 27, in Fig. 39, and having a pull band 28 connecting it to the carriage. An ink ribbon 29 is advanceable in front of the platen. The machine will have the usual ribbon feeding and vibrating mechanisms. These are omitted in order to simplify the illustration. For the same reason, the means for training the paper around the platen and the means for line-spacing rotation of the platen are omitted.

The platen 10 is an elongated one to accommodate, side by side, a sheet S to receive the preliminary typing and a sheet S' to receive the master copy typing, as indicated in Fig. 39. For said preliminary typing and for said copy typing the type heads bear a lower case type 30 and an upper case type 31. Both are preferably printer's eight point type.

The main frame 32 bears all of the typewriter mechanism and also bears the mechanism providing for justified copy typing. Rearwardly of the keyboard the frame is made materially wider than a standard typewriter frame and also materially longer to accommodate the said justifying mechanism. Most of the latter is comprised in a unit removably mounted in the main frame, at the rear of the carriage.

Said justifying unit includes a frame casting whose upper portion forms flat upwardly converging front and rear walls 33 and 34 respectively. In the present instance the slope of said walls is forty-five degrees. Integrally formed with said walls there are vertical webs or end walls 35 and 36, extending above and below the sloping and vertical webs or walls 37 and 38 spaced inward from the walls 35 and 36 and extending below them. Said webs 35 and 36 and the opposite sides of the main frame have registering apertures through which a pair of horizontal cross rods 39 and 40 are passed and releasably secured against endwise withdrawal. These rods removably support the unit in the main frame and also provide support for certain operating parts.

Spaced above the line of intersection of the planes of the sloping frame walls 33 and 34 there is a horizontal cross shaft 41 rotatably mounted at its ends in bearings in the end walls 35 and 36 and releasably secured against endwise shift. A series of escapement or carriage stop elements 42 are mounted upon shaft 41. Preferably there is a rather large number of these elements, say one hundred. Each comprises a thin metal plate rectangular in general and having, near its center, an aperture 43 receiving the shaft. At one side of the shaft said aperture has V-shaped notches 44 and 45 whose purpose will be explained hereinafter. The stop elements are canted or obliquely disposed in the planes thereof upon the shaft and each has, at its upper corner a peaked stop portion 46 for cooperation with an escapement element to control travel of the carriage for master copy typing. The stop elements are all slidable individually and collectively along the shaft for setting them varying distances apart in the series and also for moving the series along the shaft.

For setting the stop elements there is a series of wedges or space bands 47. These are arranged in two oppositely inclined sets. The wedges of one set are supported on edge for longitudinal sliding reciprocation upon the upper surface of the sloping wall 33 and the wedges of the other set are similarly supported on edge upon the upper surface of wall 34 for longitudinal reciprocation. The wedges are also slidable laterally upon said sloping surfaces.

Each wedge comprises a thin metal strip (see Figs. 35 to 38 inclusive. Its left-hand face is flat and in a vertical plane, except for a shallow rectangular depression 48 extending inward from the lower end of the wedge to a mid-point in the length of the wedge. The right hand face 49 of the wedge slopes longitudinally toward the left face from a point spaced from the lower end of the wedge to the upper end of the wedge at which point the wedge is quite thin. Along its larger lower end portion its right-hand surface is parallel to the left-hand surface. From a point opposite the upper end of the said recess 48 to the lower end of the wedge the right-hand surface has its longitudinal margins cut back or depressed, as at 50, leaving a central relieved portion 51. The latter nests within the recess 48 of the next adjacent wedge to the right to provide for compact arrangement of the wedges in each set. As indicated in dotted lines in Fig. 35, said relieved portion tapers from its upper end to the lower end of the wedge. That is in order to provide clearance for tilting of one wedge relatively to the adjacent wedges for a purpose which will be explained hereinafter. Along its lower longitudinal edge each wedge is formed with a series of gear teeth 52 and, along its upper longitudinal edge, it is formed with a series of gear teeth 53. The latter series has a gap 54 near its upper end. The margin of the wedge containing the teeth 53 is extended beyond the lower or larger end of the web to provide a lug 55. Each wedge also has a central longitudinal slot 56 extending from the upper end portion of the wedge to a mid point in the recess 48 and rounded at its ends. This slot receives the shaft 41.

When the wedges are in their normal, retracted positions their upper end portions project between the stop elements 42, and the rounded upper ends of the wedge slots 56 aline with the apertures 43 in the stop elements and engage the shaft 41. The stop elements are also wedge shaped; a portion 57 of the left-hand face of each slopes to fit the sloping face 49 of the next adjacent wedge at the left. Said sloping face of the stop element also has a raised area 42ª to fit within the slot 56 of the wedge at the left and hold the stop element in proper relation to the wedge. The right-hand surface of each stop element is vertical. The maximum thickness of the stop element and the minimum thickness of the upper end of the wedge together preferably equals .035 of an inch. The thickness of the teeth 52 and 53 is also .035 of an inch. The wedges of the rear set, resting on the sloping wall 34, and their companion stop elements 42 alternate with the wedges of the front set, resting on the sloping wall 33, and their companion stop elements. Alternate ones of the stop elements are canted edgewise in one direction to fit their companion wedges and the intervening stop elements are canted edgewise in an opposite direction to fit their companion wedges. The angular arrangement of the two sets of wedges and their companion stop elements, together with the nesting of the wedges in each set enables a maximum number of stop elements and wedges to be accommodated within a given distance along the line of carriage travel.

Figure 10:
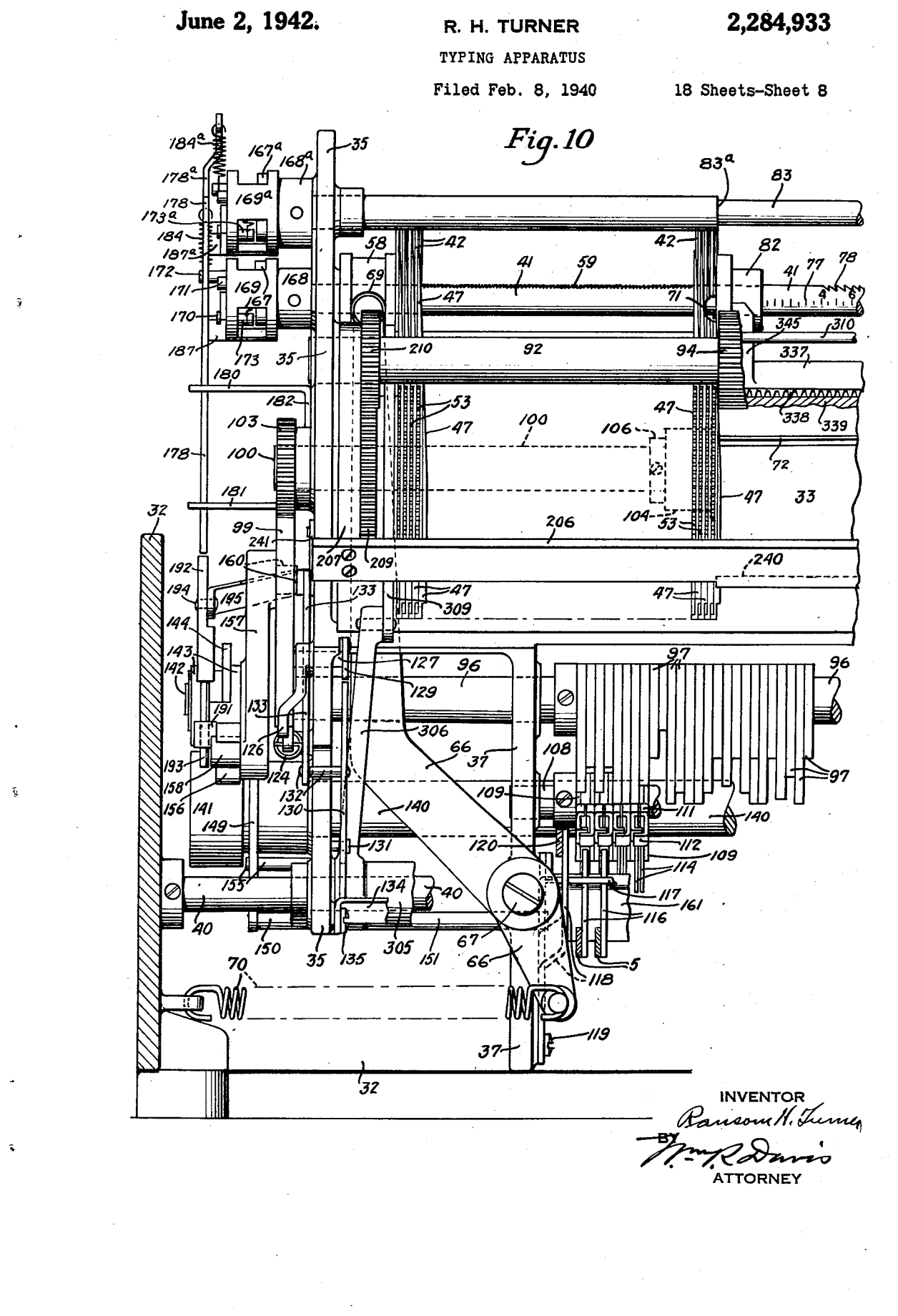

A collar 58 is slidably fitted upon the shaft 41 to bear against the left-hand end of the bank of stop elements and wedges. Said shaft has, upon its upper side, a series of ratchet teeth 59 with abrupt right-hand faces and sloping left-hand faces. A ratchet pawl 60 is pivotally mounted upon a pin 61 within a slot 62 in the collar and has teeth 63 to engage and fit the teeth 59, as shown in Fig. 31. In order to provide the collar with substantial abutment area to engage said bank the collar is formed with flat arms 64 diverging downward similarly to the divergence of the oppositely sloping wedges of the bank. The collar also has a peripheral slot 65 extending around a major portion of its circumference. As shown in Figs. 2 and 10, a lever 66 is fulcrumed upon the frame web 37, as at 67. An upwardly extending arm of this lever has a fork 68 at its upper end bearing rollers 69 which engage the collar within the slot 65 thereof. The lever also has a downwardly extending arm to which one end of a contractile spring 70 is anchored. The opposite end of said spring is anchored to the main frame 32. Said spring constantly tends to rock the lever to force the collar 58 against the bank of stop elements and wedges and tends to force the bank to the right along the shaft 41.

An escapement element 71 (see Figs. 27, 28, 29, and 41) is formed on, or rigidly secured to, the shaft 41 at a fixed point along the line of carriage travel. This element is in the form of a narrow triangular teat or tooth projecting from the periphery of the shaft. Normally, when all of the wedges are retracted and the bank of wedges and stop elements are in normal position at the left, said escapement element is in a position to engage the second one of the stop elements 42, counting from the right-hand end of the bank, and resist movement of the bank to the right under the influence of the spring 70. The escapement element is of a size to pass through the aperture notches 44 of the stop elements. The positions of these notches, around the shaft axis, alternate on the successive stop elements. When the escapement element is out of register with the notch 44 of said second stop element the latter is held by the escapement element against movement to the right. When, however, the shaft is rocked in one direction the escapement element is brought into register with said notch 44 to free the said second stop element and permit the spring 70 to force the bank to the right until the escapement element abuts the immediately following stop element whose notch 44 is out of register with the notch 44 of the preceding stop element. When the shaft is rocked in the opposite direction the escapement element is brought into register with the notch of said following stop element to free the latter and permit the bank to advance another step until the next succeeding stop element abuts the escapement element. The stop elements are thereby released in succession by rocking shaft 41 in opposite directions. The means for so rocking the shaft will be described hereinafter.

Since the wedges and stop elements are all sandwiched together in the bank, each time that a stop element is released as just described and forced to the right its companion wedge is also released and forced to the right therewith so that the wedge can be advanced to set the stop. The advance of the wedges is caused by means responsive to operation of the character keys of the typewriting machine. Before the beginning of the aforesaid preliminary typing only the foremost stop element, at the right-hand end of the bank, and its companion wedge at the left face thereof, are free of the escapement element 71. Upon depression of a character key for typing, said wedge will be advanced to a greater or less degree according to the particular character key struck and said foremost stop element will be advanced a degree depending upon the degree of advance of the wedge. The depression of said key also causes operation of the escapement element 71 to release the following stop element and its companion wedge for advance. Then, when another character key is struck, said second wedge is advanced to appropriately set said second stop element. Thus, each time that a character key is struck, a stop element is released and when another character key is subsequently struck the companion wedge for said element is advanced to set the element. Each time that the space bar is struck however, a stop element is released but no wedge is advanced. Operation of a wedge is skipped, each time that the space bar is struck and the skipped wedges are left in normal, fully retracted position for subsequent use in word spacing and line justifying. The means for advancing the wedges and controlling their advance in accordance with the character typed will be described hereinafter.

Provision is made for locking, against the longitudinal displacement, wedges which have been advanced for stop setting and also wedges which have been skipped by space bar operation. For that purpose two locking strips or fins 72 are provided. These are fitted in slots 73 formed in the walls 33 and 34 and extending along the line of carriage travel. The upper edge of each strip is shaped to fit between the wedge teeth 52. Each strip is formed on a bar 74 which at its ends has pin-and-slot pivotal connections with crank arms 75. The latter are affixed to a rock shaft 76, one for each strip, and mounted in bearings in the justifier frame. The strips are slidably fitted in the said slots and when the rock shafts are rocked in one direction the fins are projected to operative position above the upper surfaces of the walls 33 and 34. When the shafts are rocked in the opposite direction the strips are retracted below said surfaces. Means for rocking said shafts will be described hereinafter.

The locking strips are held against longitudinal movement and are mounted in such longitudinal position that, upon advance of the first wedge at the right-hand end of the bank, after release of the stop element immediately at the left thereof, the left-hand end of one of said strips will enter a space between the teeth 52 of said wedge. This will occur whether said wedge has been advanced for stop setting or not. Thereby, the wedge will be locked against longitudinal displacement. Each succeeding wedge escapement-released, and advanced along the line of carriage travel, will be similarly locked, one of the strips locking the front set of wedges and the other locking the rear set. The pitch and arrangement of the teeth 52 along each wedge are so related to the adjacent locking strip and to the different degrees of travel of the wedge for the different character spacings that an interdental space will always occur in alinement with the locking strip.

Shaft 41 bears a scale 77 arranged and graduated to indicate, in ems, the advance of the stop elements along the shaft due to the release and setting thereof as the said preliminary typing progresses. Said shaft also has a series of ratchet teeth 78 spaced similarly to the graduations of said scale and having abrupt left-hand faces and sloping opposite faces. A stop slide 79 is mounted upon the shaft and bears a pivoted pawl 80 having teeth 81 like the teeth 78 to engage the latter. The stop slide is shiftable to the left along the shaft, its pawl teeth ratcheting over the teeth 78, to adjust the left-hand end of the slide into register with a desired graduation of the scale to determine the line length of the subsequent master copy typing. The pawl is manually releasable to permit shift of the slide to the right along the shaft. Between the slide and the bank of stop elements and wedges, a collar 82 is slidably mounted upon the shaft. This collar is forced to the right along the shaft by the advance of the foremost stop element, and the right-hand end of the collar serves as an index to indicate upon the scale the degree of said advance. In the said preliminary typing the operator will stop typing before the collar reaches the stop slide. Then, the aforesaid skipped wedges will be advanced to spread the stop elements apart in groups for word-spacing. Said spread is limited by contact of the collar with the stop slide, for line justifying, as will be more fully explained hereinafter.

A horizontal cross shaft 83, parallel to shaft 41 and spaced directly over the latter and above the stop elements 42, is rockably mounted in bearings in the opposite end plates 35 and 36 of the justifier frame. Keyed to said shaft and slidable therealong there is a sleeve 84 formed at its left-hand end with a depending escapement tongue 85 and at its right hand end with an upwardly extending abutment lug 86. A pair of vertically arranged end plates 87 are arranged at opposite ends of the typewriter carriage and are rigidly connected by a cross web 88. The said web has a sleeve portion 88ª embracing the carriage bar 11 and fitting between the carriage end plates 9 to cause the plates 87 to travel with the carriage in a fixed relation thereto. The right-hand plate 87 is spaced materially outward from the adjacent end of the carriage and extends materially rearward. Frame plate 36 bears a roller 88ᵇ over which the upper edge margin of web 88 travels. The right-hand plate 87 rigidly bears a cross-rod 89 spaced above the shaft 83 and parallel thereto. A collar 90 is slidably mounted upon said cross-rod and may be secured in any adjusted position therealong by a set screw or other suitable means. The collar is disposed to abut the right-hand face of the lug 86 on the sleeve 84 and carry the sleeve along with it to the left as the carriage moves step-by-step in the said typing of the master copy. Another collar 91 is borne by the rod 83 for adjustment therealong. This second collar is engageable with the left-hand face of the lug 86 to retract the sleeve 84 to the right as the carriage is returned after the typing of a line.

The stop portions 46 of the stop elements 42 are in staggered arrangement along the series. Those borne by the stop elements which are acted upon by the forward set of wedges are offset rearwardly from those borne by the stop elements acted upon by the rear set of wedges. By rocking of the shaft 83 in opposite directions the escapement tongue 85 is shiftable into alinement with said offset stop portions alternately. Referring to Fig. 34, the tongue is shown in position to engage a forward one of said stop portions. When the shaft is rocked clockwise it will dispose the tongue free of said stop portion and into alinement with a rearwardly offset stop portion of the immediately following stop element so that the tongue can pass the first stop portion and engage the second thus permitting the carriage to travel a step to the left. By means described hereinafter, when the apparatus is conditioned for master copy typing, the shaft 83 is rocked in one direction by the operation of any one of the character keys or the space bar and, by a following operation of any one of the character keys or the space bar, the shaft is rocked in the opposite direction. Thus the escapement tongue is caused to cooperate with the set stop elements to control the travel of the carriage in master copy typing.

A pair of front and rear shafts 92 and 93 respectively, are rotatably mounted in bearings in the opposite end plates 35 and 36 of the justifier frame. These shafts are parallel to shaft 41 and equally spaced to the front and rear of the latter. Each has keyed thereto an axially elongated gear 94. The left-hand end of this gear is disposed slightly to the right of the position occupied by the series of teeth 53 on the wedge at the right-hand end of the bank when the stop elements and wedges of the bank are in their normal positions at the left. The right-hand end of the gear is substantially coincident with the right-hand ends of the locking strips 72. The gears are spaced slightly outward from the normal position of the wedge teeth 53 and each has a series of teeth profiled to engage the teeth 53, and a single wide tooth 95.

Each wedge as it is escapement-released and advanced to the right in the preliminary typing, passes under one of said gears 94. As previously mentioned, each wedge has a gap 54 in its series of teeth 53. When an unadvanced wedge passes under the gear its said gap is disposed directly opposite said wide tooth of the gear. The gap provides clearance to receive the wide tooth and enables the wedge to be tilted upwardly about the shaft 41 to free the teeth 52 of the wedge from the associated locking strip 72 so that the wedge can then be advanced for the aforesaid word-spacing operation. Other wedges which have been advanced for character-space setting of the stops have their gaps 54 shifted beyond the wide gear tooth 95 and the latter blocks tilting of these advanced wedges so that they remain locked by the strip 72 in their different advanced positions. By means to be described hereinafter, the gears are rotated to advance and retract the word-spacing wedges.

The key-responsive means for advancing the wedges 47 and controlling their advance for character-space setting of the stop elements 42 will now be described. Spaced below the sloping walls 33 and 34 there is a cross-shaft 96 parallel to the line of carriage travel, journaled in the depending frame members 35, 37 and 38 and held against endwise displacement. Between said members 37 and 38, radially extending stop members 97 are keyed to shaft 96 and extend downwardly therefrom. The number of these stop members corresponds to the number of types upon all of the type heads, each of which bears two types. Each has a radial stop edge 98 and said edges of different members are spaced varying degrees around the axis of the shaft 96. In the present instance there is a range of twenty-five different spacings of said edges from the rearmost one of the edges. Said edges are engageable with key-set stops to determine the degree of advance of the wedges and provide for twenty-five different degrees of advance of the wedges and twenty-five different settings of the stop elements. As is well known in the art of printing, different characters, both lower case and upper case, should have different setwise spacing along a printed line in order to give the printing a desired well-balanced, finished appearance. The wedges are all tapered to the same degree and along the same length thereof and, by advancing the wedges different degrees according to the different character keys struck and according to the case of the characters typed, the stop elements 42 are given settings appropriate to the characters typed in the said preliminary typing. Thereby the stop elements are properly set for the subsequent typing of the master copy.

Shaft 96 extends to the left beyond the frame plate 35 and there has a gear segment 99 keyed to it. Spaced above the shaft 96, and within the hip of the sloping walls 33 and 34, there is a pair of cross-shafts 100 and 101, parallel to shaft 96. Shaft 100 is mounted for rotation in bearings in the frame member 35 and in a frame web 100ª and extends to the left beyond the frame plate 35. There it has a gear 103 keyed to it and meshing with the segment 99. Shaft 101 is also rotatably supported in bearings in the frame member 35 and in web 101ª. Both shafts of the pair are secured against endwise shift. A gear 104 is mounted upon shaft 100 in a position to mesh with the teeth 52 of the wedge located at the right-hand end of the bank of stop elements and wedges when they are in their normal, left-hand positions, as viewed from the front of the machine. A gear 105 is keyed to shaft 101 and meshes with gear 104. Both of said gears are held by collars 106 on the shaft and by the web 100ª against displacement along the shaft. The gears project through slots in the walls 33 and 34 to mesh with the wedge teeth, and the thickness of their teeth corresponds with that of the wedge teeth, that is, .035 of an inch. Gear 104 has a hub containing ball clutch means 107 (see Fig. 7) enabling the shaft 100 to drive the gear only when the shaft is rotated counter-clockwise, with reference to Figs. 1, 6 and 7.

A cross shaft 108 is supported by the frame members 37 and 38. Said shaft is parallel to shaft 96 and located below and to the rear thereof. It bears a series of forwardly extending key-set stop members 109 and also a series of key-set stop members 110 alternating along the shaft with the members 109 and extending farther forward than the latter. There is one of the members 109 for each lower-case character and one of the members 110 for each upper-case character. Each member 109 and each member 110 has, intermediate its ends, a laterally bent stop flange 111. Each of said members also has at its forward extremity a laterally bent lug 112. Said lugs of the members 110 are spaced forwardly of the lugs of the members 109. All of the members 109 and 110 are individually rockable vertically upon the shaft 108. The shaft is held against endwise displacement and the members 109 and 110 are held in fixed positions along the shaft. A cross bar 113 is rigidly borne by the frame members 37 and 38 and underlies all of said stop members. Normally the stop members rest upon said bar which supports them with their stop flanges 111 alined across the machine and in positions out of reach of the stops 97 on the shaft 96. The lugs 112 of the members 109 then also aline across the machine, as do said lugs of the members 110. Each of the members 109 and 110 also bears a dog 114 pivoted thereto, as at 115. Each dog has an upper tappet arm normally projecting forward from the flange 111 and a lower tappet arm extending below the stop member. Each dog and each stop flange 111 is in a fore-and-aft vertical plane with one of the stop members 97.

The character key levers 5 (see Figs. 1 and 6) extend rearward from their fulcrum rod 6 and each has pivoted to its rear end an upwardly extending tappet 116. A rocking frame has a cross strip 117, slotted to slidably receive the tappets 116 therethrough, and depending legs 118 pivotally connected, as at 119, to the frame members 37 and 38. A link 120 is pivotally connected at one end to said frame and pivotally connected at its opposite end to the upstanding shift lever arm 16. When the latter is in normal position, for lower case typing, it, through said link, holds the rock frame in a position to dispose the upper ends of the tappets directly beneath the lugs 112 of the rockable stop members 109. A spring 121 also assists in holding the rocking frame in said position. One end of the spring is anchored to one of the legs of the rocking frame and its opposite end is anchored to a pin 122 on the frame member 38. A pin 123, also on said frame member, engages the rear edge of the said leg to limit rearward movement of the rocking frame. By operation of any one of the character keys its tappet 116 is elevated to strike the overlying stop lug 112 and raise the stop member 109 bearing said lug to position the flange 111 thereof in the path of the appropriate one of the stops 97. Contact of said stop 97 with the forward edge of the flange 111 will limit rotation of shaft 96 and the wedge-driving segment 99 and thereby properly limit the advance of the driven wedge to set a stop element 42 appropriately to the character typed.

When a shift key is operated for upper case typing the arm 16 will be rocked forward to elevate the platen. Said movement of arm 16 will cause the link 120 to rock the tappet-guiding frame forward and dispose the tappets 116 beneath the lugs 112 of the longer stop members 110. Then upon operation of a character key for typing, its connected tappet will strike the overlying lug 112 and elevate the stop 110 bearing the lug into the path of the appropriate stop 97. The stops 97 in line with the flanges 111 of the stops 110 are spaced farther forward than those in line with the stop flanges on the stops 109. Therefore, in upper case typing, the appropriate stop 97 can move farther before it strikes the flange 111. That permits the segment 99 to move farther for increased advance of a wedge to set a stop element 42 appropriately to the upper case character typed.

Figures 3, 4:
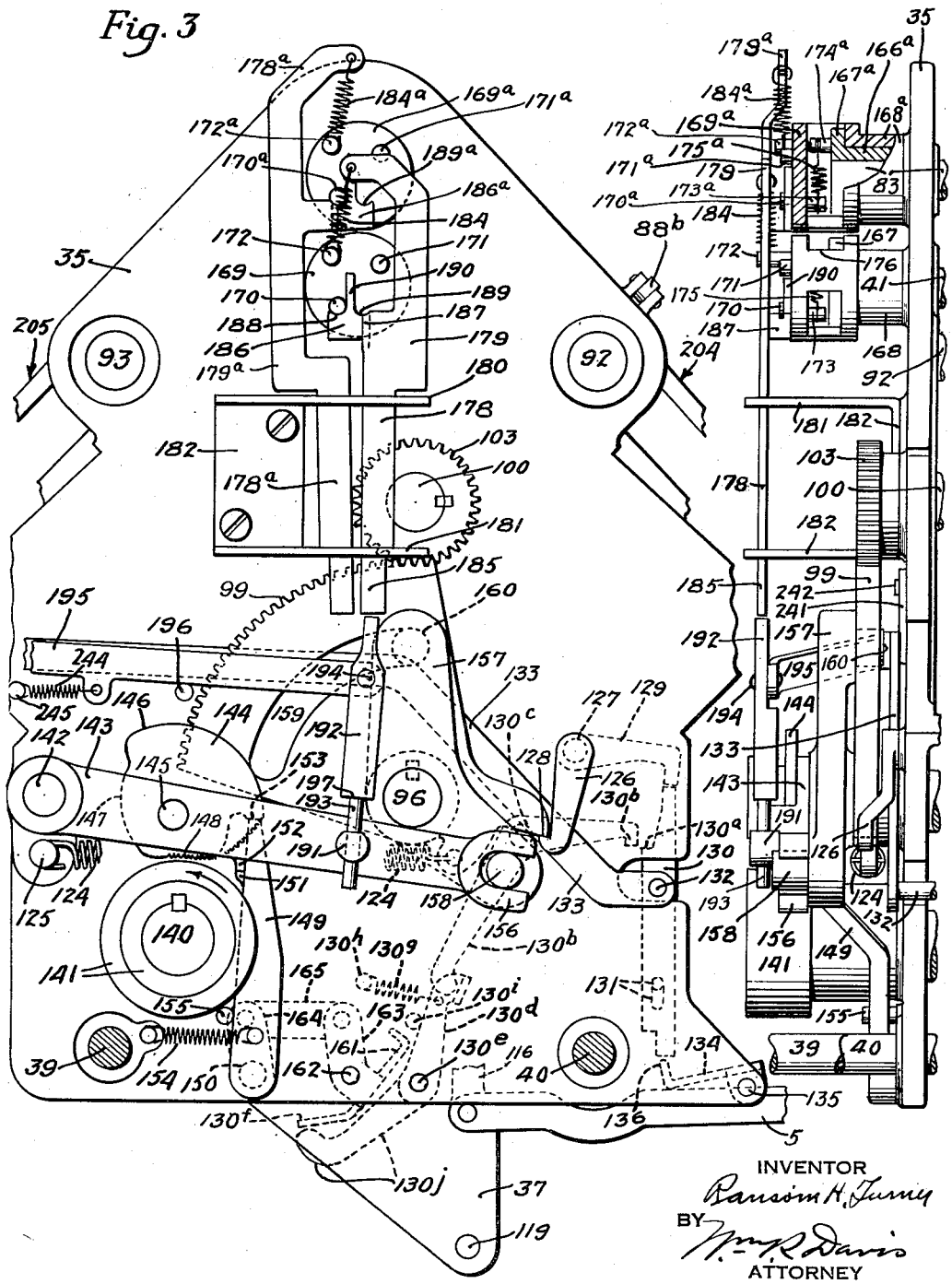
Fig. 3 is an enlarged section approximately on the line 3—3 of Fig. 2.
Fig. 4 is a front elevation of the mechanisms shown in Fig. 3, parts being in section.

Segment 99 is spring driven for advancing the wedge. A tension spring 124 is anchored at one end to the segment, at a point below the shaft, and at its opposite end to a pin 125 affixed to the frame member 35. In Fig. 3 the segment is in normal position and the spring is stretched and tending to swing the segment clockwise for wedge-driving. Latch means are provided to resist the spring tension and hold the segment cocked. A latch hook 126 is affixed to the outer end of a pin or shaft 127 pivotally borne by the frame member 35. This hook normally engages a locking shoulder 128 on the segment to hold the segment against movement by the spring. Affixed to the inner end of the pin 127 there is a forwardly extending trip arm 129 (Figs. 3 and 10) with a down-turned end. Beneath said arm there is a tappet bar 130 having a pin-and-slot connection 131 with the frame member 35, at the inner side of the latter, and a pivotal connection 132 with a link 133. The connections support the tappet for vertical reciprocation and with its upper end directly beneath the forward end of the arm 129. A universal bar 134 overlies the key levers 5, rearwardly of the fulcrum rod 6, and has its opposite ends pivotally connected, as at 135, to the frame members 35 and 36. Said universal bar extends rearwardly from its pivot axis, and its rear portion normally rests upon the levers 5 and has an upturned flange 136 directly beneath the lower end of the tappet bar 130.

Upon operation of any one of the character keys the tappet bar is forced upward to strike the arm 129 and rock the hook 126 free from the locking shoulder on the segment 99 and permit the spring 124 to rock the segment and drive the appropriate wedge to stop-setting position.

The segment 99 is power-retracted after driving a wedge. An electric motor 137 is mounted, as shown in Figs. 2 and 39, upon the right-hand side of the main frame and has a worm 138 affixed to its shaft. Said worm meshes with a worm-wheel 139 keyed to a shaft 140 extending crosswise of the machine parallel to shaft 96 and located below and to the rear of the latter. Said shaft 140 is journaled in bearings in the frame side plates 35 and 36 and is constantly driven by the motor, when the machine is in service. It extends to the left beyond plate 35 and there has affixed to it a driving drum 141 with a peripheral friction-driving surface (see Fig. 3). The plate 35 bears a stub shaft 142 upon which a lever 143 is pivotally mounted at one end. Said lever extends forwardly across the upper side of the drum 138 and bears a driving tumbler or cam 144 eccentrically pivoted, as at 145, upon the lever at a point directly over the drum. The periphery of said cam includes a concentric arcuate high portion 146 merged at one end abruptly with an eccentric serrated portion 148 leading from said low point to the opposite end of the high portion. A latch 149 is affixed to a shaft 150 journaled in the frame members 35 and 37. The latch extends upward from said shaft and has, at an intermediate point in its length, a shoulder 151 engageable with a lug 152 on the lever 143 to support the lever in a normal position elevated above the drum 141. The upper end of the latch is engageable with a stop shoulder 153 on the inner face of the cam 144. When the latch is engaged with said lug 152 and with said shoulder 153 the cam is held out of engagement with the rotating drum 141. A spring 154 anchored at one end to the latch and at its opposite end to one of the rods 39 normally holds the latch in normal position against a stop pin 155 on the frame plate 35, as shown in Fig. 3.

At its forward end the lever 143 has a fork 156. A bell-crank lever 157 is rockably mounted on the shaft 96, at the outer face of the wedge-driving segment 99, and one arm of said lever bears a pin 158 which projects into said fork. The segment has an arcuate, concentric slot 159. A pin 160 borne by the other arm of the lever 157 projects into said slot. When the segment and the lever 143 are in their normal positions the pin 160 is at the right-hand end of slot 159, as shown in Fig. 3.

Key-responsive means are provided to couple power to the lever 157 for rocking the segment 99 back to normal position after it has been operated by spring 124 for driving a wedge. Beneath all of the pivoted dogs 114 borne by the rockable stops 109 and 110 there is a universal bar 161 having an upturned forward edge engageable by the lower ends of said dogs. At its opposite ends said universal bar is pivotally mounted, as at 162, upon the frame members 37 and 38 to swing about a cross axis located rearward of its said turned-up edge. At its end adjacent the frame member 37 the universal bar is formed with an upwardly extending arm 163 (see Fig. 3). An upwardly extending crank arm 164 is affixed to the inner end of the shaft 150, and a link 165 is pivotally connected at one end to said crank arm and at its opposite end to said arm 163 of the universal bar. The normal position of the universal bar is, through said connections, determined by the normal position of the latch 149 which is spring-held against the stop 155. The lower end portions or tails of the dogs 114 normally rest upon the upturned edge of the universal bar which holds the dogs in such position that their upper ends project forward from the stop flanges 111 on the rockable stops 109 and 110.

When a character key is operated it causes its connected tappet 116 to be raised to elevate the appropriate one of the stops 109 or 110 and causes release of the driving segment 99 for actuation by its spring 124, as previously described to drive a wedge for appropriate stop setting. The particular stop 97 in line with the elevated stop 109 or 110, before it reaches the stop flange 111 of the elevated stop strikes the upper end of the dog 114 on the latter and rocks the dog counter-clockwise, with reference to Figs. 1 and 6. That causes the tail of the dog to rock the universal bar 161 clockwise and, through the connections previously described, rock the latch 149 forward to free the lever 143 and the cam 144, as shown in Fig. 14. The serrated face of the cam then drops in contact with the rotating drum 141 and the latter rotates the cam to bring its high portion in contact with the drum. Thereby the lever 143 is rocked upward to rock the bell-crank 157 counter-clockwise, as shown in Figs. 14 and 15. The pin 160 on the bell crank then engages the left-hand end of the segment slot and rocks the segment 99 counter-clockwise back to normal position where it is automatically latched by the hook 126. The low point of cam 144 then approaches the drum 141, the lever 143 is lowered and the lug 152 and cam shoulder 153 reengage the latch 149. All of the parts are then in their normal positions, as shown in Fig. 3.

The upward swing of the lever 143 by the power means is also made to cause the operation of mechanism for rocking the shaft 41 to swing its escapement element 71 back and forth and release the stop elements 42 in succession, as previously described. Shaft 41 has a squared end protruding from the outer face of frame plate 35 (see Figs. 23 to 26). A sleeve 166 is affixed to said shaft end and is formed with a radial crank arm 167. Another sleeve 168 is rotatably mounted on sleeve 166 and has a hollow cylindrical head 169 partly enclosing said crank arm. Upon its outer end face said head bears a pair of pins 170 and 171, at diametrically opposite sides of its axis, and an intermediate pin 172. The head also bears an internal pin 173 projecting inward from its end wall, and the crank arm bears an outwardly projecting pin 174 within the head. A tension spring 175 connects the pins 173 and 174. The head has a peripheral slot 176 extending around approximately one-half of its periphery and a narrower slot 177 at the opposite side of the axis. Pin 173 is located in the middle of slot 177.

A substantially vertical push-bar 178 is located at the outer side of the end wall of the head 169. Said bar has a stem 179 supported and guided for vertical reciprocation within slots in vertically spaced shelf-like members 180 and 181 of a bracket 182. The bracket is secured to the outer face of the frame plate 35. At its upper end the push-bar has a rearwardly extending arm 183. A tension spring 184 connects said arm to the pin 172. The lower end portion 185 of the stem is of reduced width to provide a shoulder to rest upon an end margin of the slot in the lower shelf 181, through which the stem extends, and thereby limit downward movement of the bar. The slot in the upper shelf is wider than the stem to permit rocking of the push-bar transversely of the axis of the head 169. At an intermediate point the push-rod has a lateral extension 186 bent inward toward the adjacent end face of the head 169 as at 187, and then bent rearward to lie parallel to said face. Said extension has a pair of side-by-side, upwardly facing notches 188 and 189 separated by an upstanding finger 190 formed on the extension.

A pin 191 is swiveled upon the outer face of lever 143 and has a transverse bore. A tappet 192 has a reduced stem 193 slidably fitted in said bore. Said tappet has a pivotal connection 194 with one end of a rearwardly extending link 195. A pin 196 borne by the frame plate 35 is engageable by the under side of said link to prevent the link from dropping. The link and the pin 194 normally support the tappet in a position inclined slightly forwardly from the vertical, with its upper end spaced slightly below the lower end of the push-bar 178 and with its body spaced above the pin 191. With the tappet in such position, upward movement of the lever 143 by the power means will cause the pin 191 to strike a shoulder 197 upon the tappet, force the tappet up against the push-bar and drive the latter upwardly, as shown in Fig. 15.

As shown in Figs. 3, 20 and 24, in a normal position of the parts for rocking the shaft 41, the push-bar notch 188 is directly beneath the pin 170, the spring 184 is at an inclination to exert a tension tending to rock the push-bar and press its finger 190 against the pin 170, pin 173 is at one side of a vertical line through the axis of the shaft 41 and the crank-arm 167 is also rocked to one side of said axis. When the push-bar 178 is forced upward it, by its action upon the pin 170, rotates the head 169 clockwise, with reference to Figs. 20, 24, 25 and 26. That carries the pin 173 clockwise and, when said pin passes a dead-center relation to shaft 41 and pin 174, the spring 175 swings the crank arm 167 counter-clockwise and rocks the shaft 41 and its escapement element 71 counter-clockwise. Said escapement element is thereby positioned to pass through the notch 44 of the nearest stop element 42 and to stop the following stop element. As shown in Fig. 21, the pin 171 is then disposed at the inner side of the portion 187 of the push bar, the pin 172 has been displaced at the opposite side of the vertical line from its first position, and the spring 184 is biased in a direction to exert a pull upon the push-bar to press the portion 187 laterally against the pin 170. Therefore when lever 143 and the tappet 192 drop, the push-bar will descend and when the portion 187 is below the pin 170 spring 184 will rock the push-bar to dispose its notch 189 directly under the pin 171, as shown in Fig. 22.

Another upward thrust of the push-bar 178 in response to operation of a character key or the space bar will cause the push-bar to act on the pin 171 and rotate the head 169 counter-clockwise. That will shift the pin 173 to the opposite side of a line through the crank-pin 174 and the axis of shaft 41 and cause the spring 175 to swing the crank 167 and shaft 41 clockwise and rock the escapement element 71 to a position to release another one of the stop elements 42. Thus each time that the push-bar is thrust upwardly the shaft 41 will be rocked in one direction or the other.

Provision is made for operation of the escapement element 71 in response to operation of the space bar 4 without causing release of the latch 126 and operation of the wedge-driving segment 99 by its spring. To that end one of the space bar levers 23 is provided with a rearward extension 200 having an upwardly directed tappet end 201 (see Figs. 1 and 2). Universal bar 161 is formed with a rearwardly extending tongue 202 overlying said tappet end. Each time that the space bar is struck said tappet end strikes the tongue 202 and rocks the universal bar and its arm 163. Thereby, through the link 165 the crank arm 164, the shaft 150 and the power clutch latch 149 are rocked to release the lever 143 and the cam 144. The cam will then engage the rotating drum 141 to cause upward rocking of lever 143 for operation of the push-bar 178, the shaft 41 and its escapement element 71, as previously described. Since the universal bar 134 is not operated by the space bar the segment latch 126, operated by the bar 134, remains in latching position and prevents the segment 99 from driving a wedge. Thus, each operation of the space bar causes the skipping of a wedge. The wedges so skipped are reserved for subsequent advance to set the stop elements 42 for word spacing and line justifying.

Figure 11:
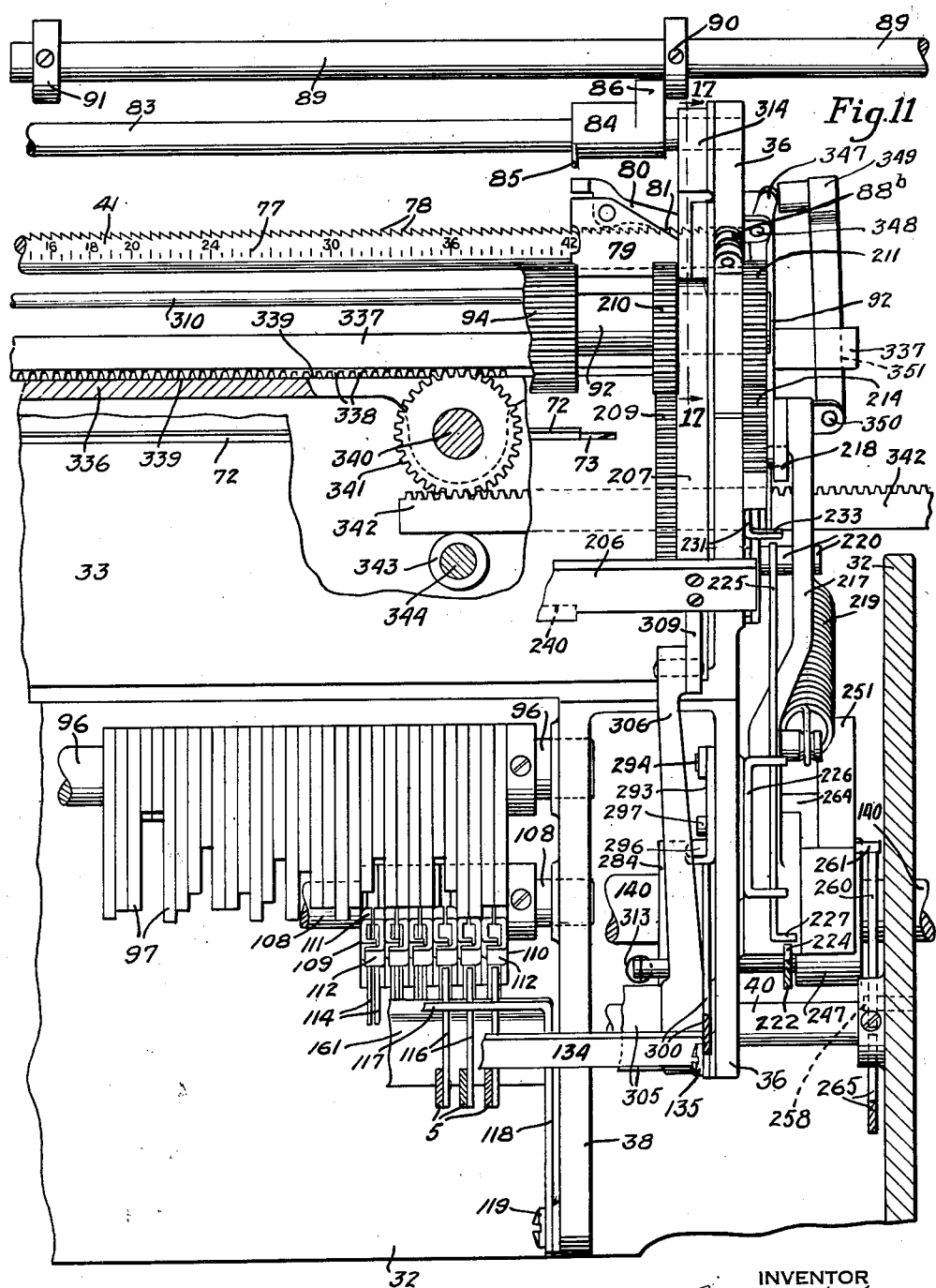
Fig. 11 is an enlarged vertical section approximately on the line 11—11 of Fig. 2, with parts broken away and parts omitted.
Figure 12:
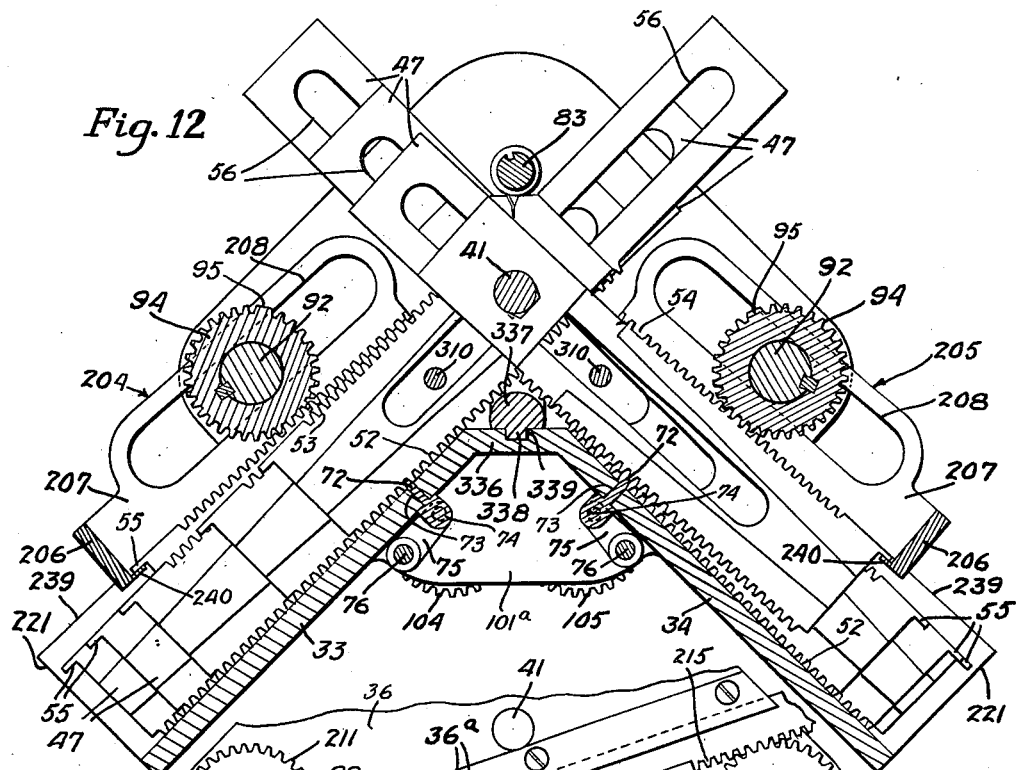
Fig. 12 is a vertical section approximately on the line 12—12 of Fig. 2, showing a number of the spacing wedges advanced for character space setting of stop elements and others of the wedges advanced for word space setting of stop elements.

The keyboard of the typewriting machine includes a line-justifying key 203 located at the right hand side of the keyboard (see Fig. 2). There is provided mechanism responsive to depression of said key to advance the said reserved wedges in unison for word spacing and line justifying. This mechanism includes a pair of U-shaped wedge-lifting frames 204 and 205, overlying the sloping frame walls 33 and 34 respectively. Each frame comprises a cross-bar 206 and upwardly extending legs 207 located at the inner sides of the frame plates 35 and 36. The legs have longitudinal slots 208 closed at their ends and receiving one of the shafts 92 or 93 upon which one of the elongated gears 94 is mounted. Each leg rigidly bears a gear rack 209 along its lower edge and facing upward at the inner side of the leg. A pair of gears 210 are keyed to each shaft 92 and 93 and mesh with said racks respectively. Each of said gears has a large tooth normally fitting in a gap in the rack. Said shafts extend to the right, beyond the frame plate 36 (see Figs. 9, 11 and 13), and there the forward shaft 92 has a gear 211 keyed to it and the rear shaft 93 has a gear 212 keyed to it. At its outer face frame plate 36 has a pair of obliquely arranged guides 36ª secured to it. A rack bar 213 is held by said guides for longitudinal sliding therebetween. Along its upper edge said bar has rack teeth 214 meshing with the gear 211 and along its lower edge the bar has rack teeth 215 meshing with the gear 212. The bar passes under the gear 211 and over the gear 212.

Frame plate 36 rigidly bears, at its outer face, a stub shaft 216 in a position in front of the power shaft 140. A lever 217 is rockably mounted upon said shaft. A link 218 is pivotally connected at one end to the upper end of said lever and pivotally connected at its opposite end to the rack bar 213. A tension spring 219 is anchored at one end to the lever 217, at an intermediate point in the length of the latter. The opposite end of the spring is anchored to a pin 220 borne by the frame plate 36. Said spring constantly tends to rock the lever rearward to advance the rack bar 213, rotate the gears 211, 212 and 210 and force the wedge lifting frames 204 and 205 upwardly. Locking means however are provided to normally prevent such advance of the lifting frames. The bar 206 of each of said frames has its opposite ends extended beyond the legs of the frame, and the plates 35 and 36 have, at their front and rear edges, keeper shoulders 221 normally engaged by said bar ends. The weight of the lifting frames normally holds them swung downward about the shafts 92 to maintain said locking engagements.

Mechanism is provided for unlocking the frames 204 and 205 in response to operation of the justifying key 203. Said key is mounted on a lever 222 fulcrumed intermediate its ends, as at 223, upon the cross rod 6 (see Fig. 40). The key lever has an upwardly extending rear end 224 (see Fig. 9). A tappet bar 225 is supported for vertical reciprocation by a bracket 226 mounted upon the outer side of the frame plate 36. This tappet bar has an outturned foot 227 located directly over said end of the key lever. A rocker 228 is pivotally mounted, as at 229, upon the outer side of the frame plate. This rocker has a forwardly and downwardly extending arm 230 whose outer end is disposed beneath the adjacent locking end portion of the bar 206 of the lifting frame 204. Said rocker also has a forwardly extending arm 231 and a downwardly and rearwardly extending arm 232. Arm 231 has a laterally bent end 233 located directly over the upper end of the tappet bar 225. Spaced rearwardly across the frame plate 36, another rocker 234 is pivotally mounted, as at 235, upon the outer side of the plate. It has an upwardly extending arm 236 and a downwardly and rearwardly extending arm 237 whose outer end is disposed beneath the adjacent locking end of the bar 206 of the lifting frame 205. A link 238 is pivotally connected to the lower end of the arm 232 of the first rocker and pivotally connected at its opposite end to the arm 236 of the second rocker.

Depression of the justifying key 203 causes the rear end 224 of its lever to rise, force the tappet bar 225 upward, swing the rocker 228 clockwise and the connected rocker 234 counter-clockwise. The arms 230 and 237 of said rockers respectively then swing the lifting frames 204 and 205 upward about the shafts 92 and free the locking ends of their bars 206 from the keeper shoulders 221. The spring 219 can then act to swing the lever 217 which slides the rack bar 213 obliquely upward. Said movement of the rack bar causes rotation of the gears 211 and 212, shafts 92 and 93, gears 94 and gears 210. The latter are rotated in opposite directions and mesh with the racks 209 on the lifting frames to drive both frames obliquely upward. The frame plates 35 and 36 have oblique edges 239 on which the locking ends of the bars 206 ride after they are freed from the keeper shoulders. These edges are so disposed as to support the lifting frames with their racks in mesh with the gears 210 for upward driving of the frames by said gears.

The lower edge of each lifting-frame bar 206 has rigid therewith a longitudinal flange 240. This flange is of the same length as the elongated gears 94 and its ends are in the same fore-and-aft planes with the ends of said gears. The flanges 240 are arranged to lie directly below the lugs 55 of wedges which have been permitted to advance to the right along the line of carriage travel by the operation of the escapement element 71, but which have been skipped by space bar operations. When the lifting frames have been rocked upward and released by operation of the justifying key, as just described, their flanges 240 act upon the lugs 55 of said wedges to tilt the wedges upwardly about the shaft 41 to free them from engagement with the locking strips 72. Then the elongated gears 94 advance all of the tilted wedges of both front and rear sets upwardly to space the stop elements 42 for word spacing and line justifying. The advance of said wedges and the lifting frames will be limited by the engagement of the collar 82 on the shaft 41 with the adjustable stop slide 79 on said shaft which is set to limit the length of the typed lines of the master copy. As the word-spacing wedges are so tilted they will tilt their companion stop elements 42 edgewise on the shaft 41. The tilting of said stop elements, however, is slight and the stop portions 46 are so designed with relation to the cooperating carriage-controlling escapement element 85 that the latter will still coact with said stop portions properly when the stop elements are tilted.

Rocking of shaft 83 and the carriage-controlling escapement element 85 borne thereby is accomplished by the aforesaid power means acting through a mechanism similar to that employed for rocking the shaft 41 and its stop-releasing escapement 71. A push-bar 178ª is supported by the bracket shelves 180 and 181 for vertical reciprocation and rocking movement similarly to the push-bar 178. Shaft 83 (see Fig. 4) has affixed thereto a sleeve 166ª with a crank arm 167ª similar to the sleeve and crank arm 166 and 167 respectively, and a sleeve 168ª similar to sleeve 168 is rotatable upon sleeve 166ª and has a hollow head 169ª similar to head 169 and with pins 170ª, 171ª, 172ª, 173ª and 174ª arranged similarly to the pins 170, 171, 172, 173 and 174 respectively. There are also springs 175ª and 184ª arranged similarly to the springs 175 and 184 and with their anchorages arranged similarly to those of the latter springs. The push-bar extension 186ª however extends in the opposite direction from that of extension 186. Its notches 188ª and 189ª however, are arranged in a relation to the pins on the rotary head similar to that of the notches 188 and 189.

Referring to Fig. 3, when the push-bar 178ª is thrust upward the head 169ª will be rocked clockwise and cause rocking of crank-arm 167ª and shaft 83 with its escapement element 85 counter-clockwise to permit advance of the carriage one step in the typing of the master copy. Upon return movement of the push-bar, spring 184ª draws the bar to the right to dispose its notch 189ª beneath the pin 171ª. Then when the bar is thrust upward again it causes counter-clockwise rotation of the head 169ª and rocking of the crank-arm 167ª, shaft 83 and escapement element 85 clockwise to permit advance of the carriage another step.

For operating the push-bar 178ª the tappet 192 is shifted, in response to operation of the justifying key 203, into a position to operate bar 178ª instead of bar 178. As previously mentioned, a link 195 is pivotally connected at one end to the tappet 192. The opposite end of this link is pivotally connected to a rocker 241 (see Fig. 14). Said rocker is pivotally mounted, as at 242, upon the outer side of frame plate 35 and has an arm 243 normally underlying an adjacent one of the locking ends of one of the lifting frame bars 206. A tension spring 244 has one end thereof anchored to the link 195 and the opposite end anchored to a pin 245 on the frame plate 35. Said spring pulls the link in a direction to press the rocker arm 243 against the under edge of said bar 206. The weight of the frame 205, of which said bar is a part, is sufficient to resist the pull of said spring and cause the link to normally hold the tappet 192 beneath the push-bar 178. When, however, frame 205 is rocked upward by the rocker 234, at the opposite side of the machine, in response to operation of the justifying key, the rocker 241 will be freed and spring 244 will rock the tappet 192 to dispose its upper end beneath the push-bar 178ª. Then, upward swing of the lever 143 in response to operation of the character keys and the space bar in the typing of the master copy will cause operation of the push-bar 178ª and rocking of the carriage-controlling escapement element 85 for step-by-step feed of the carriage.

In the typing of a line of the master copy the wedge driving segment 99 should not be operated. Therefore, means are provided for releasing latch 149 (Fig. 3) in response to the operation of the character keys and the space bar without release of the segment latch 126. As previously mentioned, a link 133 has a pivotal connection at one end with the tappet bar 130. At its opposite end said link is pivotally connected to the rocker 241 along with the link 195 (Fig. 14). When said rocker is held in normal position by engagement of the lifting frame bar 206 therewith the link 133 holds tappet bar 130 in normal position with its upper end beneath the downwardly extending end of the releasing arm 129 of the segmental latch 126. When, however, the lifting frame is raised to advance the word-spacing wedges, and the rocker 241 is swung by spring 244, the link 133 is moved to swing the tappet bar 130 from beneath said end of the segment latch-releasing arm and into a position to dispose a tappet shoulder 130ª of the bar beneath a downwardly extending end of a lever 130ᵇ. Lever 130ᵇ is fulcrumed intermediate its ends upon a pin 130ᶜ borne by the frame plate 35. The opposite end of lever 130ᵇ is in opposed relation to a laterally bent end of an arm 130ᵈ fixed to a shaft 130ᵉ journaled in plates 35 and 37. An arm 130ʲ also fixed to said shaft extends downward and underlies a rearwardly extending tongue 130ᶠ formed on the universal bar 161. A spring 130ᵍ is anchored at one end to said lever arm with the laterally bent end and anchored at its opposite end to a pin 130ʰ borne by said frame plate. The spring normally holds said lever arm in engagement with a stop pin 130ⁱ borne by the frame plate and tends to maintain lever 130ᵇ and arm 130ᵈ in their normal positions.

When the tappet-bar 130 is in its said swung position, upward swing of the universal bar 134 in response to operation of any one of the character keys will cause the tappet bar to operate the lever 130ᵇ and arm 130ᵈ to rock shaft 130ᵉ and arm 130ʲ. The latter will operate the universal bar 161 to cause release of the latch 149 for swing of the lever 143 and operation of the tappet 192 and push-bar 178ª to cause rocking of the carriage-controlling escapement element. In master copy typing, operation of the space bar causes release of the latch 149 and operation of the lever 143 and tappet 192 as in the preliminary typing. In the master copy typing however, the tappet 192 operates on the push-bar 178ª to rock the carriage-controlling escapement element 85 instead of the stop-releasing escapment element 71. The element 85 then cooperates with the set stop elements 42 to control the word spacing as the space bar is operated.

After the typing of a line of the master copy all of the advanced wedges must be retracted to normal position preparatory to the preliminary typing of another line. Key-responsive means are provided for retracting the wedges. The wedges which have been advanced for word spacing should be first retracted in order to relieve the pressure upon the other advanced wedges. The keyboard of the typewriting machine has, at its right-hand side, a key 246 and there is mechanism responsive to depression of this key to cause retraction of the word-spacing wedges.

Figure 13:
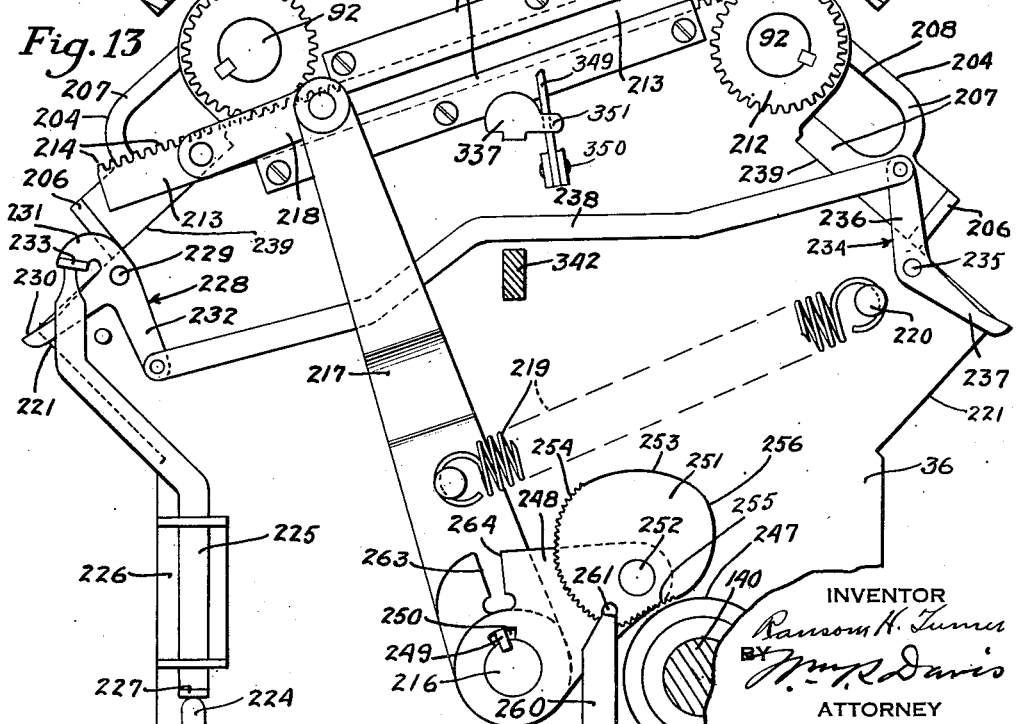
Fig. 13 is a view similar to Fig. 9, with parts broken away and certain of the parts in the positions which they assume upon operation of the line-justifying key.

Referring to Figs. 9 and 13, the power shaft 140 has affixed thereto a driving drum 247 similar to the drum 141 at the opposite side of the machine. A rocker 248 is pivotally mounted upon the shaft 216 outwardly of the lever 217. Shaft 216 has a key 249 which projects into a key-way 250 of said rocker, and the key-way is arcuate in cross section to permit of limited swinging of the rocker on the shaft. A tumbler or cam 251 is rotatably mounted, as at 252, upon the rocker. The peripheral surface of said cam includes a high arcuate portion 253 concentric to the pivot 252, an eccentric serrated portion 254 leading from a low point 255 of the cam to one end of said arcuate portion, and a smooth eccentric portion 256 leading from said low point to the opposite end of said high portion. A bell-crank stop lever 257 is pivotally mounted upon a pin 258 borne by the adjacent side wall of the main frame 32. One arm 259 of said lever extends forward and the other arm 260 extends upward. Cam 251 has, at its outer face, a stop pin 261. In the normal position of the parts, as shown in Fig. 9, the left-hand end of the rocker keyway 250 is in engagement with the key 249 to limit downward swing of the rocker and the said cam pin 261 is in contact with the upper end of the lever arm 260. A stop pin 262, also borne by the adjacent side wall of the main frame, underlies the lever arm 259 and prevents the lever 257 from swinging counter-clockwise. Thereby the cam 250 is held propped out of engagement with the rotating driving drum 247 and with its low point directly opposed to the drum. Lever 217 is formed with a rigid rearwardly facing abutment 263 and rocker 248 is formed with an abutment 264 opposed to abutment 263 and normally spaced therefrom, as shown in Fig. 9. When the lever 217 is rocked rearward by its spring 219, as previously described, and as shown in Fig. 13, the abutment 263 is brought more or less nearer to the abutment 264, depending on the degree of advance of the word-spacing wedges by the movement of the lever 217.

Key 246 is borne by a lever 265 fulcrumed at an intermediate point in its length upon the rod 6, as at 266. Said key lever extends rearward from its fulcrum and has an upwardly directed end 267 disposed directly beneath the forward end of arm 259 of lever 257. Depression of key 246 therefore rocks lever 257 to disengage the upper end of its arm 260 from the cam stop pin 261. Thereupon the cam 251 drops into contact with the driving drum 247 which grips the serrated surface of the cam and rotates the cam to bring its high portion into contact with the drum. That swings the rocker 248 upward, engages its abutment 264 with the lever abutment 263 and swings lever 217 to the left with reference to Fig. 9. Said movement of the lever, through the link 218, shifts the rack bar 213 to the left and causes clockwise rotation of gear 211 and counter-clockwise rotation of gear 212. Gears 210 meshing with the lifting frame racks 209 and gears 94 meshing with the teeth 53 of the tilted word-spacing wedges are thereby all rotated to retract the lifting frames 204 and 205 and also retract said wedges of both the front set and the rear set in unison. In said retraction, the lifting frames ride downward upon the inclined frame edges 239 until their cross-bars 206 reach the lower ends of said edges. Then said bars drop behind the locking shoulders 221 and lower the lifting frames to their normal positions. As the lifting frames drop, their flanges 240 permit the retracted wedges to swing downward about the shaft 41 and rest upon the upper surfaces of the sloping frame walls 33 and 34. Since said wedges are held tilted as they are retracted they are free to pass over the locking strips 72 projecting from said surfaces.

As the lifting frame 205 drops into normal position one of the locking ends of its cross-bar 206 engages the rocker 241, as shown in Fig. 4, and rocks it to shift the link 195, against the resistance of spring 244, and dispose the tappet 192 under the lower end of the push-bar 178. Therefore, in subsequent preliminary typing of another line, the push-bar 178 for rocking the shaft 41 and its escapement element 71 will be operated while the push-bar 178ª for rocking the shaft 83 and escapement element 85 will remain idle.

The keyboard of the typewriting machine also includes, at its right-hand side, a key 268 and there is mechanism responsive to depression of said key to cause retraction of the wedges which have been advanced to set the stop elements 42 for character spacing. Before said wedges can be retracted they must be unlocked by retraction of the locking strips 72 from their teeth 52. There is means responsive to operation of said key to accomplish that. Referring to Fig. 8, the strips 72, as previously described, are operatively connected to crank arms 75 affixed to rock shafts 76. Also affixed to said shafts adjacent one end thereof there are crank arms 269 extending toward each other and having a pin-and-slot connection 270 between their adjacent ends. One of the crank arms 269 has a stop lug 271 beyond said connection. The same crank arm has, between said connection and its rock shaft, a pin 272 to which the upper end of a vertical push-bar 273 is pivotally connected. Said bar has a vertical slot 274 through which projects a pin 275 borne by the frame plate 36 at its inner side. A tension spring 276 is anchored at its opposite ends to the pins 272 and 275 and tends to rock the crank arms 269 downward to retract the strips 72 below the upper surfaces of the sloping walls 33 and 34. A bell-crank stop lever 277 is pivotally mounted, as at 278, upon the inner side of the frame plate 36. This lever has an upwardly extending arm 279 and a forwardly extending arm 280. Above the latter arm a stop pin 281 is borne by said frame plate. A tension spring 282 anchored at one end to arm 280 and at its opposite end to a pin 283 borne by said frame plate normally holds said arm up against the pin 281. That disposes the lever with the upper end of its arm 279 in engagement with the crank-arm stop lug 271 so that it prevents downward rocking of the crank-arms 269 by the spring 276 and holds the locking strips projected in their operative positions.

A driving drum 284 is affixed to the power shaft 140 at a point just inside of frame plate 36. Said plate also bears a stub shaft 285. A lever 286 is rockably mounted at one end upon said stub shaft and extends forward across the upper side of said drum. Directly over the drum a tumbler cam 287 is pivotally supported, as at 288 upon the lever 286. The peripheral surface of said cam includes an arcuate high portion 289 concentric with the pivot, a serrated portion 290 leading from a low point of the cam to one end of said high portion and normally opposed to the drum 284, and an irregularly curved portion 291 leading from the low point to the opposite end of said high portion. The lever has a stop lug 292 at its forward end. A latch 293 is rockably mounted upon a pin 294 borne by the frame plate 36 and has a depending hook arm 295 to engage the under side of lug 292. Said latch also has a forwardly and downwardly extending arm 296 with a laterally bent end. A pin 297 borne by plate 36 is engageable by the under side of arm 296 to support the latch in a position to hold the lever 286 against downward movement. A stop 298 affixed to plate 36 is engageable by a stop lug 299 on a face of the cam 287 to prevent the latter from rotating and hold its serrated surface from engagement with the drum 284. The key 268 is borne by a lever 300 fulcrumed intermediate its ends upon the rod 6, as at 301. Said key lever has its rear end portion directed obliquely upward and formed with a tappet extremity 302 underlying the lower end of latch arm 296.

When the key 268 is depressed the tappet end 302 of its lever is rocked upward and in turn rocks the latch 293 to free the lever 286. The latter then drops. A vertical pull-bar 303 is pivotally connected at its upper end to the outer end of arm 280 of the stop lever 277 and has its lower end 304 bent laterally to underlie the stop lug 292 on lever 286. Thereby when lever 286 drops it rocks lever 277 to free its upper end from the crank-arm 271 and permit spring 276 to rock the connected crank arms 269 and retract the locking strips 72 below the upper surfaces of the sloping walls 33 and 34. That releases, for retraction, the wedges which have been advanced to set the stop elements 42 for character spacing.

Means are provided to retract the said wedges automatically immediately after their release in response to operation of the key 268. Sleeves 305 are rockably mounted upon the supporting cross bars 39 and 40 of the frame of the justifying apparatus. These sleeves extend substantially the full distance between the frame plates 35 and 36. Each sleeve has, rigid with its opposite end portions, crank arms 306 extending obliquely upward. Each sleeve also has, rigid with its end portion, adjacent the plate 36, a crank-arm 307. Said arms 306 of the two sleeves diverge upward and the arms 307 normally converge downwardly, as shown in Fig. 8. Between the arms 307 of the two sleeves there is a pin-and-slot connection 308. A pair of pull-links 309 are pivotally connected at one end to the pair of arms 306 of each sleeve and extend obliquely upward therefrom over the adjacent sloping frame surface. At their upper ends said links are rigidly connected by a cross-rod 310 which forms therewith a substantially U-shaped pull-frame. Said rods 310 extend through the slots 56 of all of the wedges. Each pull-link has, at its underside, a lug 311 rounded at its lower end and slidably bearing upon the adjacent sloping frame surface to support the cross-rod 310 centered within the wedge slots.

A strong tension spring 312 is anchored at one end to one of the crank arms 307 and at its opposite end to the lever 286 and is normally under slight tension. A lighter tension spring 313 is anchored at one end to an arm 206 of one of the sleeves and at its opposite end to the adjacent arm 206 of the other sleeve. Spring 313 normally holds the arms 206 in engagement with the lower edges of the sloping frame walls 33 and 34.

When the lever 286 drops after release of the latch 293 in response to operation of the key 268 the cam 287 is lowered sufficiently to disengage its stop lug 299 from the fixed stop 298 so that the cam can rotate upon its pivot. The serrated surface of the cam engages the rotating drum 284 and the latter rotates the cam to bring its high portion in engagement with the drum. Thereby the lever 286 is rocked upward to exert a pull upon the spring 312 and, through the latter, rock the sleeve arms 307 upward and the arms 306 outward to pull the cross rods 310 of the pull-frames downward and outward. Said cross rods then engage the lower ends of the wedge slots 56 and retract the wedges in unison until their lower ends engage the forward edges of the flanges 240 on the cross bars 206 of the aforesaid wedge-lifting frames 204 and 205. At that time the upper ends of the slots 208 of said lifting-frames are in engagement with the shafts 94 so that the flanges 240 of the frames form positive stops for the wedges. Stretch of the spring 312 permits the lever 286 to be swung upward by cam 287 farther than is required for operating the arms 306 to retract the wedges.

Raising of the lever 286 by the cam 287 also effects projection of the locking strips 72 into engagement with the teeth 52 of the retracted wedges. As the lever approaches the upper limit of its stroke and after it has caused operation of the arms 306 to fully retract the wedges a roller 286ᵃ borne by the lever engages the lower end of said push-bar, forces the latter upward against the resistance of spring 276 and snaps the locking lug 271 over the upper end of arm 279 of stop lever 277. Thereby the locking strips 72 are latched in operative position.

As the rotating drum 284 brings the low portion of the cam into engagement therewith the lever 286 lowers, relieves the pull upon the spring 312, and the spring 313 acts to rock the arms 306 upward and thrust the rods 310 of the pull frames obliquely upward to normal position. Upward movement of said rods is limited by contact of the arms 306 with the lower edges of the sloping frame walls 33 and 34 which serve as stops. Downward movement of the lever 286 is limited by engagement of its stop lug 292 with the hook end of the latch 293. The cam 287 comes to rest with its stop 299 in engagement with the fixed stop 298.

In preparation for the preliminary typing of another line the stop elements 42 and wedges 47 must be shoved to the left, as viewed from the front of the machine, along the shaft 41 and compacted. In order that this may be done the escapement element 71 and the escapement element 85 must be shifted to inoperative positions to clear the stop elements which have been advanced to the right of them. That is accomplished automatically by means operated by the rods 310 as they are shifted downward to retract the character-spacing wedges. An elongated slide plate 314 (see Figs. 17, 18 and 19) is disposed at the inner side of the frame plate 36 and with one of its longitudinal edges slidably bearing against the upper surface of the sloping frame wall 34. Said plate is formed at its opposite ends with lateral flanges 315 and 316 slidably engaging the adjacent surface of frame plate 36. The slide plate also has, at its lower end, a flange or rib 317 coincident with the flange 316 and projecting in the opposite direction. Along its upper end portion the slide plate has a longitudinal central slot 318 receiving the shaft 41. Above said slot the plate has a pair of spaced recesses 319 and 320 opening through the upper longitudinal edge of the plate and also through the face of the plate opposed to the frame plate 36. Flange 316 forms the upper wall of recess 320. A raised portion 321 of the face of the slide plate opposed to plate 36 forms an abutment 322. Said abutment constitutes the lower side wall of recess 319 and the latter also has a bottom wall 323 parallel to the slot 318. Inwardly of the flange 315 the slide plate bears a pin 324. A tension spring 325 is anchored at one end to said pin and at its opposite end to a pin 326 borne by the frame plate 36. The tension of the spring normally holds the slide plate in its uppermost position along the wall 34, with the lower end of the slot 318 of the slide plate in engagement with the shaft 41.

A crank arm 327 is affixed to the shaft 41 in a position between the slide plate and the frame plate 36 and bears a stop pin 328 projecting into the recess 319 of the slide plate. Said pin is engageable with the bottom wall 323 of recess 319 to limit rocking of the shaft 41 in one direction and engageable with the lower side wall of said recess to limit rocking of the shaft in the opposite direction. A crank arm 329 is affixed to the shaft 83 at a position just inside of the frame plate 36 and bears a stop pin 330 projecting into the recess 320 of the slide plate. Stop pin 330 is engageable with the inner side of flange 316 to limit rocking of shaft 83 in one direction and engageable with the opposite side wall of the recess 320 to limit rocking of the shaft in the opposite direction. One end of the adjacent wedge-restoring rod 310 projects beyond the link 309 adjacent the slide plate to a position close to the latter, as shown in Fig. 19. A locking pin 331 is slidably mounted in a bore 332 in the frame plate 36. A spring 333 interposed between an abutment 334 on said shaft and the bottom of a counterbore at the inner end of bore 331 constantly urges the pin inward toward the slide plate. The pin is so located that when the slide plate is in normal position the inner end of the pin will engage the face of the raised portion 321 of the slide plate.

When the said rod 310 is drawn downward to retract the wedges said projecting end of the rod engages the rib 317 of the slide plate and draws the slide plate downward to the position shown in Fig. 18, wherein the upper end of the slot 318 in the slide plate is in engagement with the shaft 41. Said movement of the slide plate causes its upper flange 316, by its engagement with crank pin 330, to rock shaft 83 to an extreme position and dispose the escapement element 85 out of alinement with the stop portions 46 of all of the stop elements 42. Said movement of the slide plate also causes the upper side wall of its recess 319, by its engagement with the crank-pin 328, to rock shaft 41 to an extreme position and dispose the escapement element 71 in alinement with the notches 45 of the escapement elements 42. All of said notches are in alinement along the shaft 41 and are of a size to permit the escapement element 71 to pass freely through them. The downward movement of the slide plate also disposes its abutment 322 below the stop pin 331 so that the spring 332 can snap the pin into engagement with said abutment and lock the slide in its lower position. Thereby the escapement elements 71 and 86 are held in their extreme positions so that the stop elements 42 can clear them and be restored along the shaft 41 to their normal compacted positions.

Rocking of shaft 41 to dispose the element 71 in its said extreme position also effects release of its teeth 59 from the locking pawl 60 (see Figs. 30 and 31) so that the abutment collar at the left-hand end of the bank of stop elements and wedges can be moved to the left, as viewed from the front of the machine, and permit restoration of the stop elements 42. When shaft 41 is rocked to dispose its element 71 in said extreme position the teeth 59 will be shifted out of engagement with the pawl 60 and the latter will be cammed outward to ride upon the smooth untoothed surface of the shaft so that it can slide along the shaft, and permit movement of the collar 58 to the left. The collar has flat surfaces at the bottom of its peripheral slot which are engageable with the rollers 69 to prevent rocking of the collar along with shaft 41, and the teeth 59 are wide enough to remain in engagement with the teeth of the pawl in the normal rocking of the shaft to operate its escapement element 71.

Provision is made for restoring the stop elements 42 to the left along the shaft 41 by retraction of the typewriter carriage to the right, as viewed from the front of the machine, for starting a new line of the preliminary typing. The frame of the justifying unit has a flat apex wall 336 joining the upper ends of the upwardly converging walls 33 and 34. A cross-bar 337, parallel to shaft 41, is mounted for longitudinal sliding along said wall. In cross-section said bar is rounded at its upper side and engages the under edges of the wedges. The bar has a flat under face resting upon wall 336 and formed centrally with a series of rack teeth 338 along the bar. Wall 336 has a groove 339 receiving said teeth. Between its walls 33 and 34 the justifier frame bears a short shaft 340 upon which a gear 341 is rotatably mounted. At its upper side said gear meshes with the rack teeth 338, the gear projecting through a slot in the wall 336. The teeth of another rack bar 342 mesh with the under side of gear 341. A roller 343 is supported on a shaft 344 borne by said frame and engages the under side of rack bar 342 to support it in mesh with the gear. Both rack bars are slidably fitted in apertures in the frame plate 36, and bar 342 is slidably fitted in apertures in the frame plate 36 and the right-hand plate 87 which is held to travel with the carriage. At its right-hand end bar 342 had an abutment head 342ª to engage the outer face of said plate 87 (see Fig. 41). Near its left-hand end, rack bar 337 is formed with an upstanding abutment lug 345 disposed to engage a shoulder on the collar 82.

The length of rod 342 is such that when the carriage and the right-hand plate 87 are in extreme right-hand position the head 342ª of said rod contacts the outer face of said plate. In said position of the carriage the lug 345 on the bar 337 is also in contact with the collar 82, as shown in Fig. 41. The wedges and stop elements are then all compacted at the left with the collar 82 bearing against the foremost stop element. As the carriage advances step-by-step to the left during the preliminary typing upon sheet S the setting of the stop elements 42 by the wedges advances the collar 82 to the right and the collar advances the rack bar 337 to the right. Through the gear 341 said advance of bar 337 causes advance of rack bar 342 to the left. The advance of collar 82 and bar 337 consequent to stop setting is less than the advance of the carriage and the right-hand plate 87 under control of the normal escapement 20 in the preliminary typing. Therefore said plate 87 moves away from the abutment head 342ª on the rod 342. During the master copy typing upon the sheet S' there is no further advance of collar 82 so that bars 337 and 342 remain stationary. Therefore said plate 87 moves still farther away from the head 342ª.

Advance of the carriage in both the preliminary typing and the master copy typing also causes advance of the rod 89 bearing the abutment collars 90 and 91. Collar 91 moves to the left away from the escapement element 85 and collar 90 is brought into contact with said escapement element. Then, in the master copy typing, the escapement element 85, in its cooperation with the set stop elements and through its engagement with the collar 90, controls advance of the carriage by its motor spring.

At the conclusion of the master copy typing and after retraction of all of the set wedges to normal position the carriage is manually returned to its extreme right-hand position. The right-hand plate 87 then engages the head 342ª of bar 342 and moves the bar to the right. Said movement of bar 342 rotates the gear 341 and causes movement of bar 337 and collar 82 to the left to restore the released wedges and stop elements to their normal positions at the left against the resistance of the spring 70 (Fig. 10). Return of the carriage also causes retraction of rod 89 to the right so that the collar 91 retracts the escapement element along the shaft 83.

As the carriage completes its return movement it operates means to release the stop slide 314 (Figs. 9, 17, 18 and 19) and permit it to return to normal position, restore the escapement elements 71 and 85 to normal position and re-engage the teeth 59 of shaft 41 with the pawl of collar 58. The locking pin 331 for the stop slide projects outwardly beyond frame plate 36 and has a notch 346. A small lever 347 is fulcrumed, as at 348, to the outerside of plate 36 and has one of its ends engaged in the notch 346. Another longer lever 349 is fulcrumed at one end, as at 350, to the outer side of plate 36. The opposite end of lever 350 engages the opposite end of lever 347. Rack bar 337 has a laterally projecting lug 351 disposed to engage lever 350 and rock it inward in the final stage of movement of bar 337 to the left. Such rocking of lever 350 causes rocking of lever 347 to retract the locking pin 331 from the slide shoulder 322, against the resistance of spring 333. Thereupon spring 325 retracts the slide 314 obliquely upward to normal position. Return of the slide to normal position reconditions the escapement elements 71 and 85 for service.

The operations of the various mechanisms have been described in detail along with the description of their structures but there follows a brief description of the general operation of the apparatus. The sheets S and S' are applied to the elongated platen and the stop slide 79 is adjusted with reference to the scale 77 to determine the line length for justified typing upon the sheet S'. Then the preliminary typing is done upon sheet S, the operator observing the approach of the collar 82 to the stop 79 and the number of words typed. The operation of the keys in the preliminary typing causes advance of appropriate ones of the wedges appropriate distances for setting the stop elements 42 for proper setwise spacing of the characters in the subsequent copy typing. Operation of the space bar in the preliminary typing leaves intermediate wedges unadvanced. The preliminary typing of the line is stopped before the collar 82 reaches the adjusted stop 79, the operator judging the desired spacing between them according to the number of words to be spaced. Then the justifying key 203 is struck to cause advance of the said intermediate wedges for word-space setting of the stop elements 42. As previously described, each time that a character key or the space-bar is struck and the shaft 41 is thereby caused to rock and release one of the stop elements 42 for setting, the collar 58 is spring-advanced to press the stop elements and wedges at the left of the released element to the right. As the collar 58 is so advanced its pawl 60, by engagement with the teeth 59 on the shaft 41, positively locks the collar 58 against return movement to the left. The stop slide 79 is locked against movement to the right by engagement of its pawl 80 with the teeth 78 on the shaft 41. Therefore the collar 58 and the stop slide 79 form rigid stops spaced along the shaft 41 to positively limit the spread of the stop elements along the shaft by advance of the word-spacing wedges. Thereby the length of the row of set stop elements is positively limited.

In the said preliminary typing the travel of the carriage is controlled by the conventional escapement means including the dogs 20, the ratchet 17 and the pinion 18, the pinion engaging the carriage rack 19 in the preliminary typing (see Fig. 41). The length of the row of teeth of said rack is sufficient to control the travel of the carriage for the preliminary typing of a line of maximum permissible length. To the right of said row of teeth the rack bar is smooth and clear to permit further advance of the carriage without interference from said escapement means. If a line shorter than said maximum length is typed the carriage may be freed from control by said escapement means by a conventional escapement release means, in order that the toothed length of the escapement rack can pass entirely to the left of the escapement pinion 18. The carriage can then advance to engage the collar 90 with the lug 86 of the escapement rocker 84 in preparation for the justified copy typing.

Having so set the stop elements 42 and advanced the carriage until the collar 90 engages the lug 86 of the escapement rocker 84, a copy of the line typed upon sheet S is typed upon sheet S'. In the latter typing, travel of the carriage is controlled by the cooperation of the escapement element 85 with the stop elements 42 which have been set to give appropriate setwise spacing and word spacing to the characters in the copied line. After the typing of the last character of the copied line further advance of the carriage is limited by engagement of the escapement rocker 84 with a shoulder 83ᵃ on the shaft 83 (see Figs. 10 and 41). At the conclusion of the typing of the latter line the key 246 is struck to cause retraction of the wedges which have been advanced for word-space setting of the stop elements 42. Then the key 268 is struck to cause retraction of the wedges which have been advanced for character-space setting of said stop elements. Finally the carriage is manually returned to its extreme right-hand position to condition the apparatus for typing of another line upon the sheet S and the setting of the stop elements to control the typing of a copy of said line upon the master copy sheet S'. The stop slide 79 is left set in a fixed position for the typing of successive lines so that successive lines of the master copy will be justified to column measure.

What I claim is:

1. Typing apparatus comprising, in combination, a typewriting machine for preliminary typing and for subsequent copy typing and having a traveling carriage and means to control travel thereof for said preliminary typing, a series of escapement stop elements settable varying distances apart, means responsive to operation of the character keys of the typewriting machine in said preliminary typing to set said stop elements varying distances apart in accordance with setwise spacing appropriate to the different characters typed, and escapement means cooperable with said set stop elements to control travel of the carriage for said copy typing.

2. Typing apparatus comprising, in combination, a typewriting machine for preliminary typing and for subsequent copy typing and having a traveling carriage and means to control travel thereof for said preliminary typing, a series of escapement stop elements settable varying distances apart, means responsive to operation of the typewriter character keys in said preliminary typing to set said stop elements varying distances apart in accordance with setwise spacing appropriate to the different characters typed, means also operable to set said stop elements for line justifying, and escapement means cooperable with said set stop elements to control travel of the carriage for said copy typing.

3. Typing apparatus comprising, in combination, a typewriting machine for preliminary typing and for subsequent copy typing and having a traveling carriage and means to control travel thereof for said preliminary typing, a series of escapement stop elements mounted along the line of travel of said carriage for setting them varying distances apart, a series of spacing wedges operable upon said stop elements respectively for setting them, means responsive to operation of the typewriter character keys in said preliminary typing to advance said wedges varying degrees to set said stop elements varying distances apart in accordance with setwise spacing appropriate to the different characters typed, and escapement means cooperable with said set stop elements to control travel of the carriage for said copy typing.

4. Typing apparatus comprising, in combination, a typewriting machine for preliminary typing and for subsequent copy typing and having a traveling carriage and means to control travel thereof for said preliminary typing, a series of escapement stop elements mounted along the line of travel of the carriage for setting them varying distances apart, a series of spacing wedges operable upon said stop elements respectively for setting them, means responsive to operation of the character keys and unresponsive to operation of the space bar of the typewriting machine, in said preliminary typing, to advance certain of said wedges varying degrees to set said stop elements varying distances apart in accordance with setwise spacing appropriate to the characters typed and leave intermediate ones of said wedges in retracted position, means to advance said intermediate wedges to set the stop elements for word spacing and line justifying, and means cooperable with the stop elements so set for setwise character spacing and for word spacing to control the travel of the carriage for said copy typing.

5. Typing apparatus according to claim 3 characterized in that the said spacing wedges are mounted for longitudinal reciprocation transversely of the series of stop elements and the said stop elements are wedge-shaped to cooperate with the spacing wedges.

6. Typing apparatus according to claim 3, characterized in that the said spacing wedges are mounted for longitudinal reciprocation transversely of the series of stop elements, and alternate ones of the wedges are mounted for longitudinal reciprocation at an angle to the reciprocation of the other wedges of the series, for the purpose set forth.

7. Typing apparatus according to claim 4, characterized in that the said spacing wedges are mounted for longitudinal reciprocation transversely of the series of stop elements and alternate ones of the wedges are mounted for longitudinal reciprocation at an angle to the reciprocation of the other wedges of the series, for the purpose set forth.

8. Typing apparatus comprising, in combination, a typewriting machine for preliminary typing and for subsequent copy typing and having a traveling carriage, means to control travel thereof for said preliminary typing and case shift means, a series of escapement stop elements settable varying distances apart, means responsive to operation of the typewriter character keys in said preliminary typing to set said stop elements varying distances apart in accordance with setwise spacing appropriate to the characters typed, means responsive to operation of said case shift means for the typing of upper-case characters in said preliminary typing to cause increased spacing of appropriate ones of the stop elements, and escapement means cooperable with said set stop elements to control travel of the carriage for said copy typing.

9. Typing apparatus according to claim 4, characterized in that the typewriting machine has case-shift means, and the apparatus includes means responsive to operation of the case-shift means for upper-case typing in the said preliminary typing to cause increased advance of appropriate ones of the said wedges for increased spacing of the stop elements settable thereby.

10. Typing apparatus according to claim 3 and including means to automatically lock the advanced wedges in their advanced positions.

11. Typing apparatus according to claim 4 and including means to automatically lock the advanced wedges in their advanced positions and also lock the said intermediate wedges in unadvanced position, and means to release said intermediate wedges from said locking means for advancing them for word spacing.

12. Typing apparatus according to claim 4, characterized in that the said wedges project between the said stop elements and are mounted for longitudinal reciprocation transversely of the series of stop elements and are also mounted for shifting transversely along the line of carriage travel, whereby the stop elements and wedges together constitute a bank of elements shiftable along the line of carriage travel, and the apparatus includes means acting upon one end of said bank to constantly urge it in one direction along said line, escapement means normally abutting the bank at a point remote from said end to resist said urge and responsive to operation of the character keys and the space bar of the typewriting machine in said preliminary typing to release the stop elements together with an associated one of the wedges in succession for shifting along said line from following elements of the bank so that the released stop elements may be set by advance of their associated wedges, a scale to indicate the advance of the foremost stop element along said line due to advance of the wedges in response to operation of the character keys in said preliminary typing, and positive stop means to limit advance of said foremost stop element due to advance of the line-justifying wedges.

13. Typing apparatus according to claim 4, characterized in that said wedges project between the said stop elements and are mounted for longitudinal reciprocation transversely of the series of stop elements and are also mounted for shifting transversely along the line of carriage travel, whereby the stop elements and wedges together constitute a bank of elements shiftable along the line of carriage travel, and the apparatus includes means including an abutment acting upon one end of said bank to constantly urge it in one direction along said line, means to lock said abutment against reverse movement, escapement means normally abutting the bank at a point remote from said end to resist said urge and responsive to operation of the character keys and the space bar of the typewriting machine in said preliminary typing to release the stop elements together with an associated one of the wedges in succession for shifting along said line from following elements of the bank so that the released stop elements may be set by advance of their associated wedges, a scale to indicate the advance of the foremost one of said stop elements along said line due to advance of the wedges in response to operation of the character keys in said preliminary typing, positive stop means to limit advance of said foremost stop element due to advance of the line-justifying wedges and cooperable with the said abutment to positively limit spread of the stop elements along the line of carriage travel by advance of the line-justifying wedges, and means rendering said positive stop means adjustable to vary the justified line length.

14. Typing apparatus comprising, in combination, a typewriting machine for preliminary typing and for subsequent copy typing and having a traveling carriage and means to control travel thereof for said preliminary typing, a series of escapement stop elements settable varying distances apart, means responsive to operation of the typewriter character keys in said preliminary typing to set said stop elements varying distances apart in accordance with setwise spacing appropriate to the characters typed, an escapement element shiftable between two positions in one of which it is engageable with one of said stop elements and in the other of which it is disposed to engage a following stop element, and so on along the series of stop elements, to control travel of the carriage for said copy typing, a reciprocable escapement-actuating element shiftable in one direction in response to operation of the character keys and the space bar of the typewriting machine, and means operable by one shift of said actuating element in said direction to cause shift of said escapement element to one of its said positions and operable by a following shift of the actuating element in said direction to cause shift of the escapement element to the other of its said positions.

15. Typing apparatus according to claim 1 and including means constantly urging the series of stop elements in one direction lengthwise of the series by pressure upon one end of the series, escapement means normally abutting a stop element of the series remote from said end to resist said urge, and means responsive to operation of the character keys and to operation of the space bar of the typewriting machine in the said preliminary typing to operate said escapement means to release said stop elements in succession, for the purpose set forth.

16. Typing apparatus according to claim 1 and including means constantly urging the series of stop elements in one direction lengthwise of the series by pressure upon one end of the series, an escapement element normally abutting a stop element of the series remote from said end to resist said urge and shiftable between two positions in one of which it is engageable with one of said stop elements and in the other of which it is disposed to release the first stop element and engage the following stop element and so on in succession along the series, for the purpose set forth, a reciprocable escapement-actuating element shiftable in one direction in response to operation of the character keys and the space bar of the typewriting machine in said preliminary typing, and means operable by one shift of said actuating element in said direction to cause shift of said escapement element to one of its said positions and operable by a following shift of the actuating element in said direction to cause shift of the escapement element to the other of its said positions.

17. Typing apparatus according to claim 1 and including means constantly urging the series of stop elements in one direction lengthwise of the series by pressure upon one end of the series, escapement means normally abutting a stop element of the series remote from said end to resist said urge and operable to release the stop elements in succession, for the purpose set forth, escapement-operating means operable in response to operation of the character keys and to operation of the space bar of the typewriting machine, and means to operatively connect said escapement-operating means selectively to said stop-releasing escapement means for said preliminary typing or to the said escapement means for controlling the carriage travel for copy typing.

18. Typing apparatus according to claim 4 and including means to retract the advanced wordspacing wedges in unison, and means to retract the advanced character-spacing wedges in unison.

19. Typing apparatus according to claim 4 and including a pair of wedge-restoring keys, means responsive to operation of one of said restoring keys to retract the advanced word-spacing wedges, and means responsive to operation of the other restoring key to retract the advanced character-spacing wedges.

20. Typing apparatus according to claim 4 and including a line-justifying key, and means rendering the said means for advancing the wordspacing wedges responsive to operation of said justifying key.

21. Typing apparatus according to claim 4 and including a line-justifying key and a pair of wedge-restoring keys all located at or adjacent to the keyboard of the typewriting machine, means rendering the said advancing means for the word-spacing wedges responsive to operation of said justifying key, means responsive to operation of one of said restoring keys to retract the advanced word-spacing wedges, and means responsive to operation of the other of said restoring keys to retract the advanced characterspacing wedges.

22. Typing apparatus comprising, in combination, a typewriting machine for preliminary typing and for subsequent copy typing and having a traveling carriage and means to control travel thereof for said preliminary typing, a series of escapement stop elements mounted along the line of travel of said carriage for setting them varying distances apart, a series of spacing wedges operable upon said stop elements respectively for setting them, means responsive to operation of the character keys of the typewriting machine to advance said wedges in succession, stop means to limit automatically the degree of advance of each wedge according to the one of said keys causing its advance, for the setting of said stop elements varying degrees apart in accordance with setwise spacing appropriate to the characters typed, and escapement means cooperable with said set stop elements to control travel of the carriage for said copy typing.

23. Typing apparatus comprising, in combination, a typewriting machine for preliminary typing and for subsequent copy typing and having a traveling carriage and means to control travel thereof for said preliminary typing; a series of escapement stop elements mounted along the line of travel of said carriage for setting them varying distances apart; a series of spacing wedges operable upon said stop elements respectively for setting them by advance of the wedges; mechanism for advancing and controlling said wedges comprising means responsive to operation of the character keys of the typewriting machine in said preliminary typing to advance the wedges in succession, a rockably mounted stop carrier rockable in response to operation of said character keys and bearing rigid therewith a series of stops spaced along its axis and spaced varying degrees around the axis, a cooperating series of stops extending along said axis, mounted for individual shifting and normally out of the paths of said rockable stops and each shiftable into one of said paths by operation of one of the character keys to limit rotation of the rockable stop carrier, a connection between said carrier and the wedge-advancing means to limit operation thereof and thereby limit advance of a wedge, for the purpose set forth, and means to automatically restore the wedge-advancing means and said stop carrier to normal positions independently of the advanced wedge after each character key operation; and escapement means cooperable with the set escapement stop elements to control travel of the carriage in said copy typing.

24. Typing apparatus according to claim 23, characterized in that the said wedge-advancing means includes spring means to cause operation thereof for wedge advance and also cause forward rotation of the said rockable stop carrier, and the said restoring means for the wedge-advancing means and for said stop carrier includes power-driven means and means automatically rendering said power-driven means operative to cause restoration of the wedge-advancing means and the stop carrier to normal position.

25. Typing apparatus according to claim 23, characterized in that the said wedge-advancing means includes spring means to cause operation thereof for wedge advance and also cause forward rotation of the said rockable stop carrier, the apparatus includes latch means normally holding the wedge-advancing means against operation by its said spring means and releasable by operation of the character keys, and the said restoring means for the wedge-advancing means and the rockable stop carrier includes a constantly power-driven rotor, clutch means to render said restoring means operable by said rotor, and latch means to normally hold said clutch means in inoperative position and releasable by operation of the character keys.

26. Typing apparatus according to claim 23, characterized in that the said wedge-advancing means includes spring means to cause operation thereof for wedge advance and also cause forward rotation of the said rockable stop carrier, the apparatus includes latch means normally holding the wedge-advancing means against operation by its said spring means and releasable by operation of the character keys, the said restoring means for the wedge-advancing means and the rockable stop carrier includes a constantly power-driven rotor, clutch means to render the said restoring means operable by said rotor, and latch means to normally hold said clutch means in inoperative position and releasable by operation of the character keys and the apparatus also includes means operable by said rotor when said clutch is applied to operate the said escapement means for controlling carriage travel for the said copy typing.

27. Typing apparatus according to claim 4 and including a wedge-restoring key, means operable to retract the advanced character-spacing wedges, a constantly power-driven rotor, clutch means to operatively connect said rotor to said wedge-retracting means, and latch means normally holding said clutch means inoperative and releasable by operation of said restoring key to cause application of the clutch for retraction of said wedges.

28. Typing apparatus according to claim 4 and including a wedge-restoring key, means operable to retract the advanced word-spacing wedges, a constantly power-driven rotor, clutch means to operatively connect said rotor to said wedge-retracting means, and means normally holding said clutch means in inoperative position and releasable in response to operation of said wedge-restoring key to cause application of the clutch means for retraction of the word-spacing wedges.

29. Typing apparatus according to claim 4 and including a pair of wedge-restoring keys, means operable to retract the advanced word-spacing wedges, a constantly power-driven rotor, clutch means to operatively connect said rotor to said wedge-retracting means, means normally holding said clutch means in inoperative position and releasable in response to operation of one of said restoring keys to cause application of the clutch means for retraction of the word-spacing wedges, means operable to cause retraction of the advanced character-spacing wedges, additional clutch means to operatively connect said rotor to the second-mentioned wedge-retracting means, and means normally holding said additional clutch means in inoperative position and releasable by operation of the other of said restoring keys to cause application of said additional clutch means for retraction of the character-spacing wedges.

30. Typing apparatus according to claim 4 and including locking means engageable with an edge of the advanced wedges to hold them advanced and engageable with an edge of said intermediate wedges to hold them retracted, each wedge and its associated stop element being tiltable to free the wedge from said locking means, and means to tilt the said unadvanced intermediate wedges free from said locking means for advance of the intermediate wedges for word-space setting of the stop elements.

31. Typing apparatus according to claim 4 and including a line-justifying key, locking means engageable with an edge of the advanced wedges to hold them advanced and engageable with an edge of the said intermediate unadvanced wedges to hold them retracted, each wedge and its associated stop element being tiltable to free the wedge from said locking means, and means responsive to operation of said justifying key to tilt the unadvanced intermediate wedges free from the locking means and cause advance of the intermediate wedges for word-spacing.

32. Typing apparatus according to claim 3 and including a wedge-restoring key, locking means to lock the advanced wedges in their advanced positions, and means responsive to operation of said restoring key to cause release of said locking means and retraction of the advanced wedges.

33. Typing apparatus comprising, in combination, a typewriting machine for preliminary typing and for subsequent copy typing and having a traveling carriage and means to control travel thereof for said preliminary typing, a series of escapement stop elements mounted along the line of travel of said carriage for setting them varying distances apart, a series of spacing wedges also extending along said line and operable upon said stop elements respectively for setting them, constant urging means normally tending to shift said series of stop elements and said series of wedges in one direction along said line, escapement means mounted at a fixed point along said line and normally acting to resist said shift of the two series and responsive to each character-key operation and each space-bar operation of the typewriting machine in said preliminary typing to release one of the stop elements and an associated one of the wedges from the series for setting of the released stop element by its associated wedge, means responsive to character-key operation and unresponsive to space-bar operation in said preliminary typing to cause advance of each wedge so released by character-key operation a degree according to the character key operated, for setting of the stop elements in accordance with setwise spacing appropriate to the characters typed, means for advancing the wedges released in response to space-bar operation, for word-space setting of the stop elements, and escapement means cooperable with the set stop elements to control travel of the carriage for said copy typing.

34. Typing apparatus comprising, in combination, a typewriting machine for preliminary typing and for subsequent copy typing and having a traveling carriage and means to control travel thereof for said preliminary typing, a series of escapement stop elements mounted along the line of travel of said carriage for setting them varying distances apart, a series of spacing wedges also extending along said line and operable upon said stop elements respectively for setting them and each having gear teeth along a longitudinal edge thereof, constant urging means normally tending to shift said series of stop elements and said series of wedges in one direction along said line, escapement means mounted at a fixed point along said line and normally acting to resist such shift of the two series and responsive to each character-key operation and each space-bar operation of the typewriting machine in said preliminary typing, to release one of the stop elements and an associated one of the wedges for setting of the released stop element by its associated wedge, driving gear means mounted at a fixed point along said line to mesh with the teeth of each released wedge in succession, means responsive to character-key operation and unresponsive to space-bar operation in said preliminary typing to rotate said gear, means to control the degree of rotation of said gear in accordance with the key operated, for advance of the meshed wedge for stop-setting in accordance with setwise spacing appropriate to the key operated, means to advance the wedges released in response to space-bar operation to set the stop elements for word-spacing, and escapement means cooperable with the set stop elements to control travel of the carriage for said copy typing.

35. Typing apparatus according to claim 33 and including locking means to lock the advanced and unadvanced escapement-released wedges against longitudinal displacement, and means to release said unadvanced wedges from said locking means for advance of the latter wedges.

36. Typing apparatus according to claim 34, characterized in that the wedges are mounted to render them individually tiltable and the apparatus includes a locking rib extending along the line of carriage travel and fixed against longitudinal movement and mounted to shift transversely for retraction to inoperative position and engageable when in operative position between said teeth of the advanced and unadvanced escapement-released wedges to lock them against longitudinal displacement, means to tilt said unadvanced wedges to free them from said locking rib for their advance for word-space setting of the stop elements, and means to retract said locking rib to release the wedges advanced for character-space setting of the stop elements, for retraction of the latter wedges.

37. Typing apparatus according to claim 33 and including means for retracting the advanced wedges, and means responsive to return movement of the carriage for restoring the said stop elements to normal unset position.

38. Typing apparatus comprising, in combination, a typewriting machine for preliminary typing and for subsequent copy typing and having a traveling carriage and means to control travel thereof for said preliminary typing, a series of escapement stop elements settable varying distances apart, means responsive to operation of the typewriter character keys in said preliminary typing to set said stop elements varying distances apart in accordance with setwise spacing appropriate to the characters typed, escapement means cooperable with said set stop elements to control travel of the carriage for said copy typing, means to release the set stop elements, and means responsive to return movement of the carriage to restore the released stop elements to normal unset position.

39. Typing apparatus according to claim 33 and including a scale to indicate advance of the foremost stop element along the line of carriage travel as the stop elements are successively set in said preliminary typing, and a stop settable at a selected point along said scale to limit advance of said foremost stop by the advance of the word-spacing wedges to thereby limit the line length of the copy typing.

40. Typing apparatus according to claim 33, characterized in that alternate wedges of said series of wedges are mounted for reciprocation at an angle to the reciprocation of the other wedges of the series, for the purpose set forth.

41. Typing apparatus according to claim 33, characterized in that alternate wedges of the said series of wedges are mounted to reciprocate at an angle to the reciprocation of the other wedges of the series to dispose the wedges in two divergent sets, for the purpose set forth, each wedge has a series of gear teeth along a longitudinal edge thereof, and the said character-key-responsive means for advancing the wedges includes a gear to mesh with the gear teeth of a released wedge of one of said sets, and a gear to mesh with the gear teeth of a released wedge of the other set and in mesh with the first-mentioned gear.

42. Typing apparatus according to claim 33 and including means to retract all of the advanced word-spacing wedges simultaneously to normal position, and means to retract all of the advanced character-spacing wedges simultaneously to normal position.

43. Typing apparatus according to claim 33, characterized in that alternate wedges of the said series of wedges are mounted for reciprocation at an angle to the reciprocation of the other wedges of the series to dispose the wedges in two divergent sets, for the purpose set forth, and the apparatus includes means to retract all of the advanced word-spacing wedges of both of said sets simultaneously to normal position, and means to retract all of the advanced character-spacing wedges of both of said sets simultaneously to normal position.

44. Typing apparatus comprising, in combination, a typewriting machine for preliminary typing and for subsequent copy typing and having a traveling carriage and means to control travel thereof for said preliminary typing, a series of individually settable escapement stop elements, means responsive to operation of the character keys in said preliminary typing to set appropriate ones of said stop elements for character spacing, a line-justifying key, means responsive to operation of said line-justifying key to cause setting of said stop elements for word spacing, escapement means cooperable with the set stop elements to control travel of the carriage for said copy typing, a pair of stop-releasing keys, means responsive to operation of one of said releasing keys to release said stop elements from their word-space setting, and means responsive to operation of the other of said releasing keys to release said stop elements from their setting for character spacing.

45. Typing apparatus according to claim 3 and including a main frame supporting the mechanisms of the typewriting machine, and an auxiliary frame borne by said main frame and bearing the said escapement stop elements and wedges and constituting with said elements and wedges a unit.

46. Typing apparatus according to claim 4 and including a main frame bearing the mechanisms of the typewriting machine, an auxiliary frame bearing said escapement stop elements and wedges and constituting with said elements and wedges a unit, and means detachably securing said unit to said main frame.

47. Typing apparatus according to claim 33 and including means to retract to normal position the wedges advanced for word-space setting of the stop elements, means to retract to normal position the wedges advanced for character-space setting of the stop elements, means operable by the latter retracting means to shift the said stop-releasing escapement means and the said escapement means which is cooperable with the set stop elements both clear of the stop elements, and means responsive to return movement of the carriage to restore the stop elements to normal unset position.

48. Typing apparatus according to claim 3, characterized in that the said spacing wedges are mounted for longitudinal reciprocation transversely of the series of stop elements, alternate ones of the wedges are mounted for longitudinal reciprocation at an angle to the reciprocation of the other wedges, said alternate wedges are arranged in one set and the other wedges are arranged in another set, and the wedges of each set are formed in cross section to nest in succession along the set.

49. Typing apparatus according to claim 3, characterized in that the said spacing wedges are mounted for longitudinal reciprocation transversely of the series of stop elements, alternate ones of the wedges are mounted for longitudinal reciprocation at an angle to the reciprocation of the other wedges, said alternate wedges are arranged in one set and the other wedges are arranged in another set, and the wedges of each set are formed in cross section to nest in succession along the set and are also formed with clearance therebetween for edgewise tilting individually while nested, for the purpose set forth.

50. Mechanism to control the travel of a carriage for type-character spacing, comprising a series of stop elements mounted for spacing them varying distances apart in the series, and a series of spacing wedges operable upon said stop elements respectively for setting them and individually advanceable varying degrees to set said stop elements varying distances apart in accordance with setwise spacing appropriate to different type characters, to thereby form an escapement rack of said stop elements for cooperation with escapement means to control travel of the carriage.

51. Mechanism to control travel of a carriage for type-character spacing, comprising a series of escapement stop elements mounted for spacing them varying distances apart in the series, a series of individually advanceable spacing wedges operable upon said stop elements respectively to set them, character keys, a space bar, means responsive to operation of said character keys and unresponsive to operation of said space bar to advance appropriate ones of the wedges varying degrees to set said stop elements varying distances apart in accordance with setwise spacing appropriate to the characters typed and leave intermediate ones of said wedges, reserved by operation of the space bar, in retracted position, and means to advance said reserved wedges simultaneously to set the stop elements for word spacing, to thereby form an escapement rack of said stop elements for cooperation with escapement means to control travel of the carriage.

52. Mechanism according to claim 50, characterized in that the said spacing wedges are mounted for longitudinal reciprocation transversely of the series of stop elements, alternate ones of the wedges are mounted for longitudinal reciprocation at an angle to the reciprocation of the other wedges of the series, said alternate wedges are arranged in one set and the other wedges in another set, and the wedges in each set are formed in cross section for nesting in succession along the set.

53. Typing apparatus according to claim 4 and including stop means spaced along the line of carriage travel to positively limit spread of the said stop elements along said line by advance of the word-spacing wedges.

54. Typing apparatus according to claim 4 and including right and left-hand stop means spaced along the line of carriage travel to positively limit spread of the said stop elements along said line by advance of the word spacing wedges, and means rendering said right-hand stop adjustable along said line, to preselect the line length of the typed copy, the said means claimed in claim 4 for advancing the word-spacing wedges being constructed and arranged to advance them in unison.

55. Typing apparatus according to claim 33 and including an abutment element mounted for shifting along the line of carriage travel and interposed between the said constant urging means and the combined series of wedges and escapement stop elements to transmit the thrust of said urging means to said combined series, means to lock said abutment element automatically and positively against movement reverse to its step-by-step movement by the urging means consequent to the said escapement release of said stop elements in succession, positive stop means mounted at the far side of said combined series from said abutment element to cooperate therewith to limit expansion therebetween of said stop elements by advance of the word-spacing wedges, the advancing means for the word-spacing wedges being constructed and arranged to advance them in unison, and means rendering said positive stop means adjustable along the line of carriage travel to preselect the line length of the typed copy.

56. Typing apparatus according to claim 33 and including an abutment element mounted for shifting along the line of carriage travel and interposed between the said constant urging means and the combined series of wedges and escapement stop elements to transmit the thrust of said urging means to said combined series, means to lock said abutment element automatically and positively against movement reverse to its step-by-step movement by the urging means consequent to the said escapement release of said stop elements in succession, positive stop means mounted at the far side of said combined series from said abutment element to cooperate therewith to limit expansion therebetween of said stop elements by advance of the word-spacing wedges, the advancing means for the word-spacing wedges being constructed and arranged to advance them in unison, means rendering said positive stop means adjustable along the line of carriage travel to preselect the line length of the typed copy, and a scale to indicate the progress of the setting of said escapement stop elements for character spacing and to indicate the adjustment of said positive stop means.

57. Mechanism according to claim 50, characterized in that the said series of spacing wedges includes a number of wedges arranged side-by-side in succession and formed in cross section to nest in succession, for the purpose set forth.

58. Typing apparatus according to claim 1, characterized in that the carriage, the means to control its travel in preliminary typing, the escapement stop elements, their setting means and the escapement means for cooperating with them are all constructed and arranged for both the preliminary typing and the subsequent copy typing of a line in a continued advance of the carriage in one direction.

59. Typing apparatus according to claim 2, characterized in that the carriage, the means to control its travel in preliminary typing, the escapement stop elements, their setting means and the escapement means for cooperating with them are all constructed and arranged for both the preliminary typing and the subsequent copy typing of a line in a continued advance of the carriage in one direction and the apparatus includes means to lock the escapement stop elements in their setting, means to release the set escapement stop elements from their setting for line justification, means to release the set elements from their setting for character spacing, and means for restoring said elements to normal unset position by return movement of the carriage.

60. Typing apparatus according to claim 4 and including locking means engageable with the advanced wedges to hold them advanced and engageable with said intermediate wedges to hold them retracted, each wedge being mounted for tilting to free it from said locking means, means to tilt the said unadvanced intermediate wedges in unison free from said locking means for advance of the intermediate wedges for word space setting of the respective stop elements, and stop means to prevent such tilting of the advanced wedges and hold them in engagement with said locking means.

61. Typing apparatus according to claim 4, characterized in that the said means for advancing the intermediate wedges for word space setting of the stop elements includes axially elongated gear means, each wedge has along a longitudinal edge thereof a rack, the wedges are normally supported in positions with their racks free from said gear means, and the apparatus includes locking means engageable with the advanced wedges to hold them advanced and engageable with the said intermediate wedges to hold them retracted, each wedge being mounted for tilting to free it from said locking means and bring its said rack into mesh with said gear means, said gear means being formed to obstruct such tilting of the advanced wedges and each wedge being formed to provide it with clearance located to free it from such obstruction when the wedge is retracted, and means to tilt the unadvanced intermediate wedges free from said locking means and into mesh with said gear means for advance in unison.

62. Typing apparatus according to claim 33 characterized in that the most advanced one of the said escapement stop elements, at the end of the series remote from the said urging means, is arranged to render it constantly free from the said escapement means for releasing the stop elements successively.

63. Mechanism to control the travel of a carriage for type character spacing and word spacing, comprising character keys, a space key, a series of escapement stop elements mounted along the line of travel of the carriage for setting them varying distances apart, a series of spacing wedges also extending along said line and operable upon said stop elements respectively for setting them, constant urging means normally tending to shift said series of stop elements and said series of wedges in one direction along said line, escapement means mounted at a fixed point along said line and normally acting to resist said shift of the two series and responsive to each character-key operation and each space-key operation to release one of the stop elements and an associated one of the wedges from the series for setting of the released stop element by its associated wedge, means responsive to character-key operation and unresponsive to space-key operation to cause advance of each wedge so released by character-key operation a degree according to the character key operated, for setting of the stop elements in accordance with setwise spacing appropriate to the characters represented by the character keys operated, and means for advancing the wedges released in response to space-key operation, for word-space setting of the stop elements, to thereby form an escapement rack of said stop elements for cooperation with escapement means to control travel of the carriage.

64. Typing apparatus, comprising, in combination, a typewriting machine for preliminary typing and for subsequent copy typing and having a traveling carriage and means to control travel thereof for said preliminary typing, a series of escapement stop elements arranged along the line of carriage travel and settable varying distances apart in the series, wedges, one for each of said stop elements and advanceable for setting said elements, means responsive to operation of the space bar of the typewriting machine in said preliminary typing to select appropriate ones of said wedges for word spacing, means for advancing said selected wedges in unison for word space setting of the stop elements, stop means to limit said word space setting of the stop elements and determine the length of the set series of stop elements along the line of carriage travel, and escapement means cooperable with the set series of stop elements to control the travel of the carriage for character spacing and word spacing in said copy typing.

65. A typing apparatus according to claim 1, characterized in that the means to control the travel of the carriage for preliminary typing includes an escapement rack mounted on and movable with the carriage, and the said series of settable escapement stop elements are mounted on the main frame and form a stationary rack to control the travel of the carriage for copy typing.

66. Typing apparatus comprising, in combination, a typewriting machine for preliminary typing and for subsequent copy typing of the same line typed in the preliminary typing and having a traveling carriage adapted to travel two line lengths in typing direction and means to control the carriage travel for the first line length in said preliminary typing, a series of settable escapement stop elements, means responsive to operation of the character keys in said preliminary typing to set appropriate ones of said stop elements for character spacing for the second line length in copy typing said means including a series of spacing wedges selectively operable upon said stop elements for setting them, means responsive to operation of the spacing key in said preliminary typing to select appropriate ones of said wedges for word spacing, a line justifying key, and means responsive to operation of said justifying key to move said space-key-selected wedges to set said stop elements for word spacing for the second line length in copy typing.

67. Mechanism to control the travel of a carriage of a typewriting machine, comprising a series of individually settable escapement stop elements, and a series of spacing wedges selectively operable upon said stop elements for setting them, means selectively operable to individually actuate said spacing wedges and individually advance them varying distances to set said stop elements varying distances apart to thereby form an escapement rack of said selectively set and variably spaced stop elements for cooperation with escapement means to control the step-by-step travel of the said carriage.

68. A typing apparatus comprising in combination, a typing machine for preliminary typing and for subsequent copy typing of the same line typed in the preliminary typing and having key-actuated typing means and a traveling carriage adapted to travel two line lengths in typing direction the first line length for preliminary typing and the second line length for copy typing, and key-actuated means to control the carriage travel for said preliminary typing including means to give said carriage a uniform step-by-step movement in typing direction, a series of settable escapement stop elements, and means actuated by the keys operated in preliminary typing the first line length to set the said escapement stop elements variable distances apart to form an escapement rack with variably spaced stop elements to control the carriage travel for the second line length for copy typing.

RANSOM H. TURNER.